US010318076B2

(12) United States Patent
Achiwa et al.

(10) Patent No.: US 10,318,076 B2
(45) Date of Patent: Jun. 11, 2019

(54) IMAGE DISPLAYING APPARATUS WITH CHANGED MENU BASED ON DETECTION OF MOBILE INFORMATION TERMINAL PLACED THEREON

(71) Applicant: CANON KABUSHIKI KAISHA, Tokyo (JP)

(72) Inventors: Ken Achiwa, Kawasaki (JP); Hideyasu Tomi, Yokohama (JP); Shigeki Hasui, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 369 days.

(21) Appl. No.: 14/844,933

(22) Filed: Sep. 3, 2015

(65) Prior Publication Data
US 2015/0378516 A1 Dec. 31, 2015

Related U.S. Application Data

(63) Continuation of application No. 11/864,385, filed on Sep. 28, 2007, now abandoned.

(30) Foreign Application Priority Data

Oct. 16, 2006 (JP) .................................. 2006-281738
Feb. 23, 2007 (JP) .................................. 2007-044531

(51) Int. Cl.
H04N 1/00 (2006.01)
G06F 3/042 (2006.01)
(Continued)

(52) U.S. Cl.
CPC ............ G06F 3/0425 (2013.01); G06F 3/017 (2013.01); G06F 3/0412 (2013.01);
(Continued)

(58) Field of Classification Search
CPC . G06F 3/0425; G06F 3/0416; H04N 1/00204; H04N 1/0035; H04N 1/00411; H04N 2201/006; H04N 21/43637
See application file for complete search history.

(56) References Cited

U.S. PATENT DOCUMENTS 6,127,941 A 10/2000 Van Ryzin .................... 340/4.37
7,184,391 B2 2/2007 Lee et al. .................... 369/275.4
(Continued)

FOREIGN PATENT DOCUMENTS

JP 11-353432 12/1999
JP 2001-128246 5/2001
(Continued)

OTHER PUBLICATIONS

JP 2005-252564 English Translation (published on Sep. 15, 2005) Applicant: FUJI XEROX CO LTD).*

Primary Examiner — Rinna Yi
(74) Attorney, Agent, or Firm — Venable LLP

(57) ABSTRACT

In an image processing apparatus which generates an input signal when a mobile information terminal contacts a display surface and makes a wireless communication with the contacting mobile information terminal, it is difficult to make an appropriate display by discriminating whether a contact object is a mobile information terminal or a user's finger. To accomplish this, when a mobile information terminal (200) is placed on a touch panel (104), this placement is recognized based on a wireless communication response (701), and a processing menu for the terminal is displayed. On the other hand, if the user's finger (300) is placed, since no wireless communication response (701) is detected, it is recognized that the contact object is not the mobile information terminal (200), and a general manipulation menu is displayed.

13 Claims, 24 Drawing Sheets

(51) Int. Cl.
*G06F 3/01* (2006.01)
*G06F 3/041* (2006.01)
*H04N 101/00* (2006.01)

(52) U.S. Cl.
CPC ......... *G06F 3/0416* (2013.01); *H04N 1/0035* (2013.01); *H04N 1/00204* (2013.01); *H04N 1/00411* (2013.01); *H04N 2101/00* (2013.01); *H04N 2201/0041* (2013.01); *H04N 2201/0055* (2013.01); *H04N 2201/0058* (2013.01)

(56) References Cited

U.S. PATENT DOCUMENTS

| | | | |
|---|---|---|---|
| 7,552,402 B2 | 6/2009 | Bilow | 715/862 |
| 2001/0044858 A1* | 11/2001 | Rekimoto | G06F 3/011 710/1 |
| 2004/0021698 A1* | 2/2004 | Baldwin | G06F 3/0481 715/853 |
| 2004/0117389 A1 | 6/2004 | Enami et al. | 707/100 |
| 2004/0248617 A1 | 12/2004 | Oba et al. | 455/557 |
| 2005/0192048 A1 | 9/2005 | Bridgelall | 455/553.1 |
| 2005/0245302 A1* | 11/2005 | Bathiche | A63F 13/00 463/1 |
| 2006/0001645 A1 | 1/2006 | Drucker et al. | 345/156 |
| 2006/0132501 A1* | 6/2006 | Nonaka | G06F 3/0425 345/619 |
| 2006/0212938 A1 | 9/2006 | Suzuki | 726/16 |
| 2006/0230192 A1 | 10/2006 | Parry et al. | 710/15 |
| 2007/0008300 A1 | 1/2007 | Yang et al. | 345/173 |
| 2007/0189737 A1 | 8/2007 | Chaudhri et al. | 386/125 |
| 2007/0300182 A1* | 12/2007 | Bilow | G06F 3/0425 715/799 |
| 2007/0300307 A1 | 12/2007 | Duncan | 726/27 |

FOREIGN PATENT DOCUMENTS

| | | |
|---|---|---|
| JP | 2002-352444 | 12/2002 |
| JP | 2003-280815 | 10/2003 |
| JP | 2004-185388 | 7/2004 |
| JP | 2005-252564 | 9/2005 |
| JP | 2006-195925 | 7/2006 |
| JP | 2006-262420 | 9/2006 |
| WO | 2003/021875 | 3/2003 |

* cited by examiner

F I G. 8
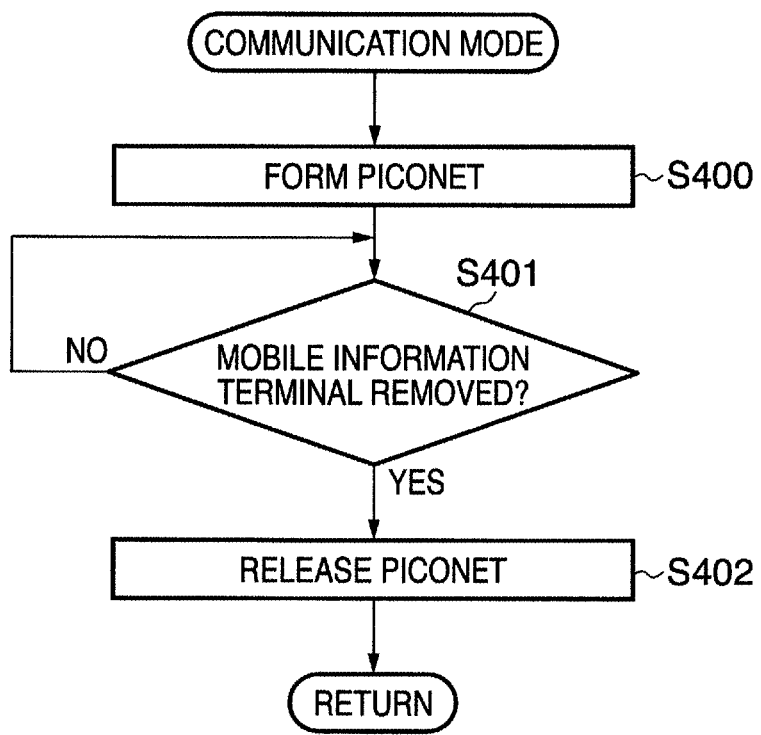

IMAGE DISPLAYING APPARATUS WITH CHANGED MENU BASED ON DETECTION OF MOBILE INFORMATION TERMINAL PLACED THEREON

This application is a continuation of U.S. patent application Ser. No. 11/864,385, filed Sep. 28, 2007, currently pending, which is incorporated by reference herein in its entirety, as if fully set forth herein; and claims the benefit of priority under 35 U.S.C. § 119, based on Japanese Priority Application No. 2006-281738, filed Oct. 16, 2006, and on Japanese Priority Application No. 2007-044531, filed Feb. 23, 2007, both of which are incorporated by reference herein in their entirety, as if fully set forth herein.

BACKGROUND OF THE INVENTION

1. Field of the Invention

The present invention relates to an image processing apparatus and control method thereof and, more particularly, to an image processing apparatus which has a display input function of generating an input signal upon contacting a display screen, and a "communicate" function with a mobile information terminal, and a control method thereof.

2. Description of the Related Art

In recent years, opportunities to print image data stored in mobile information terminals such as a mobile phone, digital still camera, notebook type personal computer, PDA, and the like using image processing apparatuses such as a printer and the like are increasing. As a method of connecting such devices, a method using wireless communications such as Bluetooth, a wireless LAN, and the like has been proposed so as to lessen the trouble of cable connections. According to such wireless communications, the user can be free from any inconvenience encountered upon manually plugging in a cable to the back surface of an apparatus such as USB, IEEE1284, and the like, and confusion about where the receptacle is (Japanese Patent Laid-Open No. 2004-185388).

However, in case of cable connections using wired interfaces such as USB, IEEE1284, and the like, the connection state between a mobile information terminal and image processing apparatus is clear. On the other hand, in case of wireless communications, such connection state between devices often becomes unclear. For example, in case of wireless communications by means of Bluetooth, since wireless communications with an effective distance of about 10 m are normally allowed, a plurality of apparatuses having an identical wireless communication function may exist within a communication range in some cases. In such cases, it is difficult to determine with which communication apparatus the mobile information terminal can communicate in practice.

The same applies to the communication apparatus side. For example, when data in an image processing apparatus is to be transferred to a mobile information terminal, a plurality of mobile information terminals having an identical wireless communication may exist within a communication range in some cases. In such cases, it is difficult for the image processing apparatus side to automatically determine with which mobile information terminal the image processing apparatus is to communicate.

For this reason, the following method has been proposed (Japanese Patent Laid-Open No. 2005-252564). That is, with this method, when a plurality of mobile information terminals which can communicate with a communication apparatus exist, a list of mobile information terminals which allow wireless communications from the communication apparatus is displayed on a display unit of the communication apparatus, and the user manually selects a destination from that list. According to this method, the communication apparatus stores device information of mobile information terminals with which it established communications previously, and displays information of these terminals on the display unit.

However, if the name or the like of each mobile information terminal is specified by a simple number or the like, even when a list of mobile information terminals that allow communications is displayed, it is not easy for the user to determine a desired terminal.

In order to solve this problem, a method of assuring a putting space for a mobile information terminal on the communication apparatus, and clearly specifying the mobile information terminal as a communication partner to the communication apparatus when the user places the mobile information terminal on the mobile information terminal putting space has been proposed. According to this method, the communication apparatus side automatically detects the mobile information terminal placed on the mobile information terminal putting space, and limits a communication partner to that mobile information terminal. As such method of limiting a communication partner, for example, according to Japanese Patent Laid-Open No. 2005-252564 above, the wireless antenna of the communication apparatus is configured to have a small size so as not to communicate with mobile information terminals other than a desired terminal. Also, a method of controlling the transmission power or reception sensitivity upon wireless communication so as not to communicate with mobile information terminals other than a desired terminal is available (Japanese Patent Laid-Open No. 2001-128246). More specifically, a part of the communication apparatus around the wireless antenna is shielded so as to control the communication apparatus to receive a radio wave in only a specific direction.

As described above, a technique for limiting a communication partner to a desired mobile information terminal when there are a plurality of mobile information terminals which can make wireless communications with the communication apparatus is about to be established. However, according to the related art, the communication apparatus does not have any function of automatically settling a communication partner, but it has an assistant function of displaying mobile information terminals that can make wireless communications from the communication apparatus on the display unit, and prompting the user to select a desired terminal. That is, since the user himself or herself confirms mobile information terminals displayed on the display unit, and manually selects a desired mobile information terminal, the communication apparatus must comprise a user interface such as a display unit and the like.

Meanwhile, in general, upon introducing a novel function to an existing apparatus, a dedicated device of the novel function is attached to the apparatus in an initial stage. In the next stage after the advancement of the technologies, an expanded device tends to be produced by incorporating the novel function in a device of the existing apparatus. For example, as a display apparatus, along with an increase in screen size of liquid crystal panels in recent years, a liquid crystal touch panel prepared by integrating a liquid crystal display (display device) and contact sensor (manipulation device) has prevailed.

Such integration may provide the following two merits. First, since a new dedicated device need not be attached to the existing apparatus, a physical installation space of the apparatus can be reduced. Second, since the user need not alternately handle a plurality of dedicated devices attached to a single apparatus, this contributes to a reduction of the operation load on the user and a short operation time.

Therefore, upon incorporating the communication apparatus in an existing image processing apparatus or the like as described above, a communication device used as the mobile information terminal putting space on the communication apparatus may be integrated with a display device such as a liquid crystal touch panel or the like. That is, upon implementing a high-speed wireless communication function as an interface with a mobile information terminal, and a large-screen, liquid crystal touch panel display function as a user interface at the same time, the installation space of the apparatus can be reduced, and the user can make more intuitive operations.

However, when these two functions are implemented on a single touch panel UI, a mobile information terminal may be placed on function selection menu buttons displayed on the touch panel UI. In such cases, the communication apparatus side may misinterpret "placement of a mobile information terminal" for "pressing of a function selection menu button". With this misinterpretation, switching of a menu display is not always done appropriately. When a mobile information terminal with a relatively large size such as a mobile phone or PDA which has a large screen and full keyboard, or a notebook type personal computer is placed on the touch panel UI, it physically covers the touch panel UI surface. As a result, the display area narrows down, resulting in poor operability.

SUMMARY OF THE INVENTION

The present invention enables realization of an image processing apparatus which generates an input signal when a mobile information terminal contacts its display surface, and makes a wireless communication with the mobile information terminal that made the contact, wherein the apparatus checks if an object with which it is in contact with is a mobile information terminal, and makes an appropriate display according to the checking result.

One aspect of the present invention provides an image processing apparatus, which comprises a display input unit adapted to generate an input signal when an object contacts a display surface that displays an image, and a wireless communication unit adapted to make a wireless communication with a mobile information terminal which contacts the display surface of the display input unit, and executes processing of image data input from the mobile information terminal, the apparatus comprising: a discrimination unit adapted to discriminate, when the display input unit generates an input signal, whether or not the object which contacts the display surface is the mobile information terminal; and a display control unit adapted to control display contents on the display input unit in accordance with a discrimination result of the discrimination unit.

Another aspect of the present invention provides a method of controlling an image processing apparatus, which comprises a display input unit adapted to generate an input signal when an object contacts a display surface that displays an image, and a wireless communication unit adapted to make a wireless communication with a mobile information terminal which contacts the display surface of the display input unit, and executes processing of image data input from the mobile information terminal, the method comprising the steps of: discriminating, when the display input unit generates an input signal, whether or not the object which contacts the display surface is the mobile information terminal; and controlling display contents on the display input unit in accordance with a discrimination result in the discriminating step.

Still another aspect of the present invention provides a computer program for making a computer execute a method of controlling an image processing apparatus, which comprises a display input unit adapted to generate an input signal when an object contacts a display surface that displays an image, and a wireless communication unit adapted to make a wireless communication with a mobile information terminal which contacts the display surface of the display input unit, and executes processing of image data input from the mobile information terminal, the program comprising the steps of: discriminating, when the display input unit generates an input signal, whether or not the object which contacts the display surface is the mobile information terminal; and controlling display contents on the display input unit in accordance with a discrimination result in the discriminating step.

Yet another aspect of the present invention provides a computer-readable recording medium recording the above computer program.

Further features of the present invention will become apparent from the following description of exemplary embodiments with reference to the attached drawings.

BRIEF DESCRIPTION OF THE DRAWINGS

FIG. 8 is a flowchart showing an operation example in a communication mode according to the first embodiment;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

An image processing apparatus according to this embodiment has a function of making wireless communications with a mobile information terminal by, e.g., Bluetooth, and limits a mobile information terminal as a communication partner by assuring a putting space for a mobile information terminal. Especially, the image processing apparatus is characterized in that a display as a liquid crystal touch panel and the mobile information terminal putting space, which are separately configured in the conventional image processing apparatus having such function are integrated.

Figure 1:
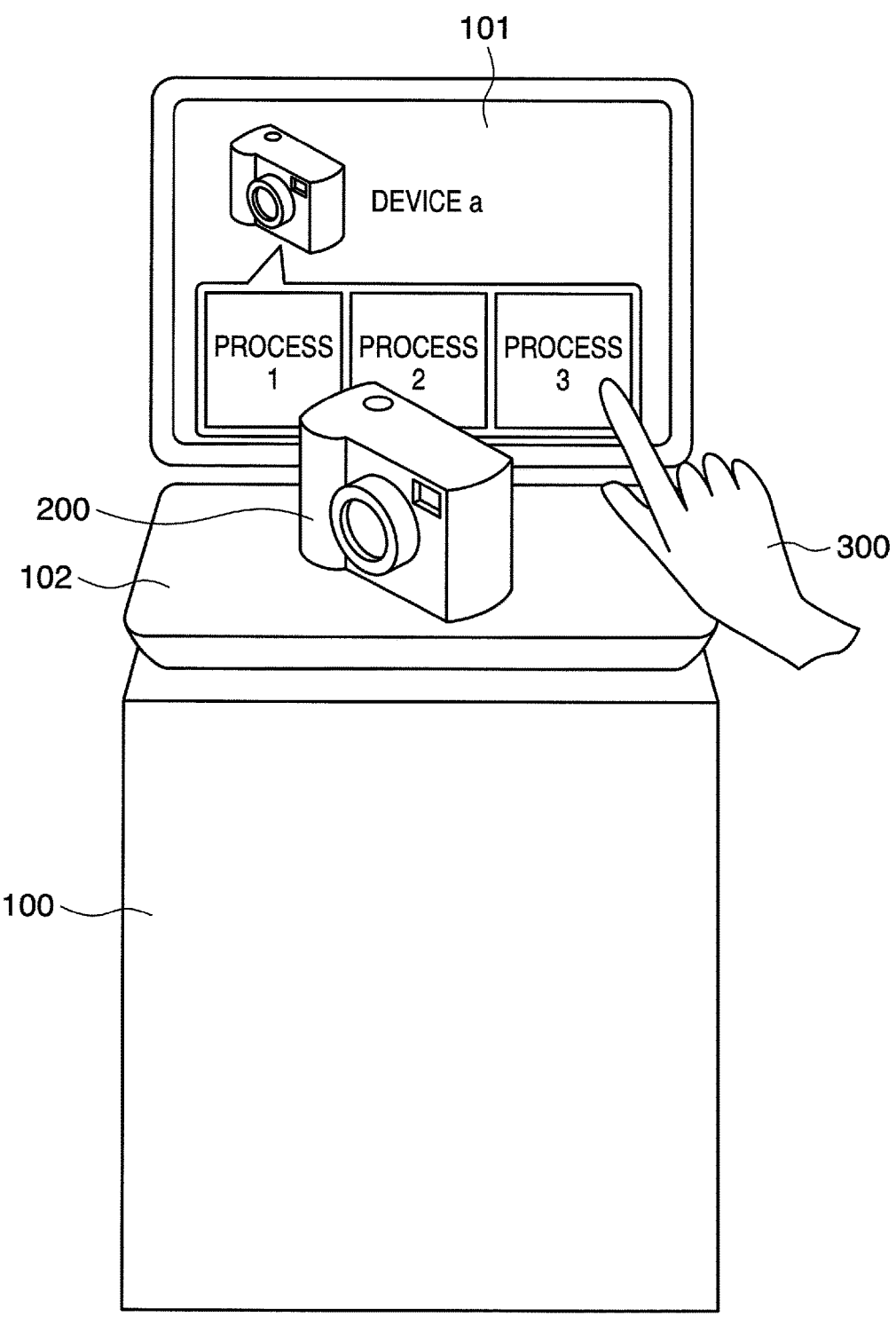
FIG. 1 is a view showing an overview of a conventional image processing apparatus.

To help easy understanding of this embodiment, the arrangement of the conventional image processing apparatus will be briefly explained first. FIG. 1 is a view showing an overview of the conventional image processing apparatus. An image processing apparatus 100 shown in FIG. 1 has a display 101 and mobile information terminal putting space 102 as independent components. The display 101 has a touch panel function, and is used to display image print menus, images to be printed, and the like, and to input user's manipulation inputs. The mobile information terminal putting space 102 is a space where a mobile information terminal 200 is placed. When the mobile information terminal 200 is placed on this putting space 102, it is detected by a sensor (not shown).

Referring to FIG. 1, upon placing the mobile information terminal 200 on the mobile information terminal putting space 102, the display 101 displays processing menus for data to be input from the mobile information terminal 200. Then, the user selects a desired process from the menus on the display 101, and presses it with a user's finger 300, thus determining the process.

Figure 2:
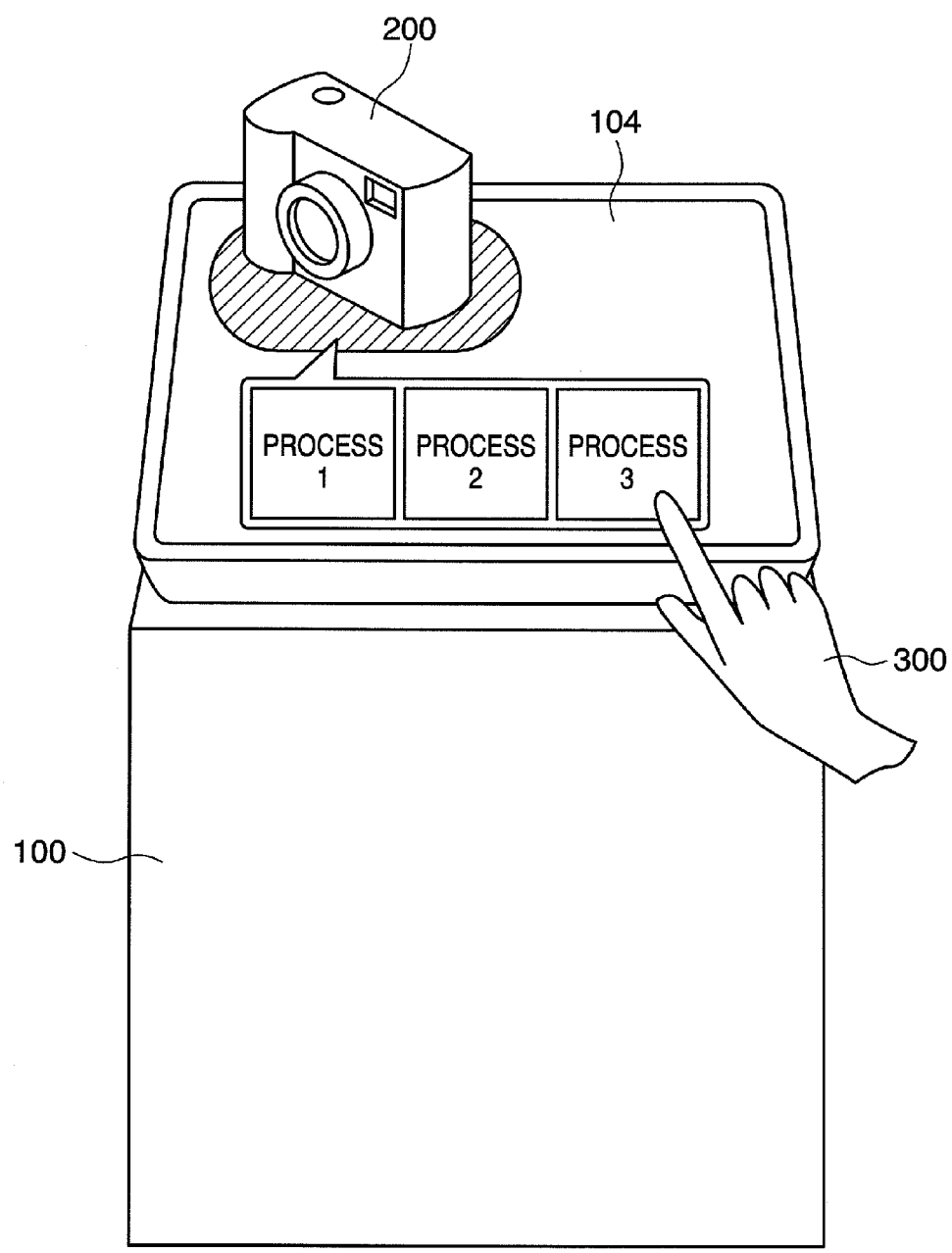
FIG. 2 is a view showing an overview of an image processing apparatus according to one embodiment of the present invention.

FIG. 2 shows an overview of an image processing apparatus according to this embodiment. An expanded interface 104 shown in FIG. 2 corresponds to that obtained by integrating the display 101 and mobile information terminal putting space 102 shown in FIG. 1, and the image processing apparatus 100 has the same arrangement as that shown in FIG. 1. The expanded interface 104 has a touch panel function, and is used to display image print menus, images to be printed, and the like, and to input user's manipulation inputs. At the same time, the expanded interface 104 also serves as a mobile information terminal putting space. When the mobile information terminal 200, the user's finger 300, or the like is placed on the expanded interface 104, it is detected by a sensor (not shown).

For the sensor, a plurality of modes are available. For example, a method of detecting reflected light by a reflective optical sensor, a method of detecting an interception of light by a transmissive optical sensor, a method of detecting a weight or pressure acting on the putting space using a weight sensor, a method of detecting a reflected wave of a transmitted ultrasonic wave by an ultrasonic sensor, and the like may be used. Furthermore, a method of discriminating a video picture captured by a camera by applying image processing to it by a visible sensor, a method of detecting a change in eddy current generated by electromagnetic induction using an induction type proximity sensor, a method of detecting a change in electric capacitance using a capacitance type proximity sensor, and the like can be adopted.

As shown in FIG. 2, since the mobile information terminal 200 is placed on the expanded interface 104, the expanded interface 104 displays a processing menu for data to be input from the mobile information terminal 200. When the user selects a desired process from the menu, and presses it with the finger 300, that process is determined.

Figure 3:
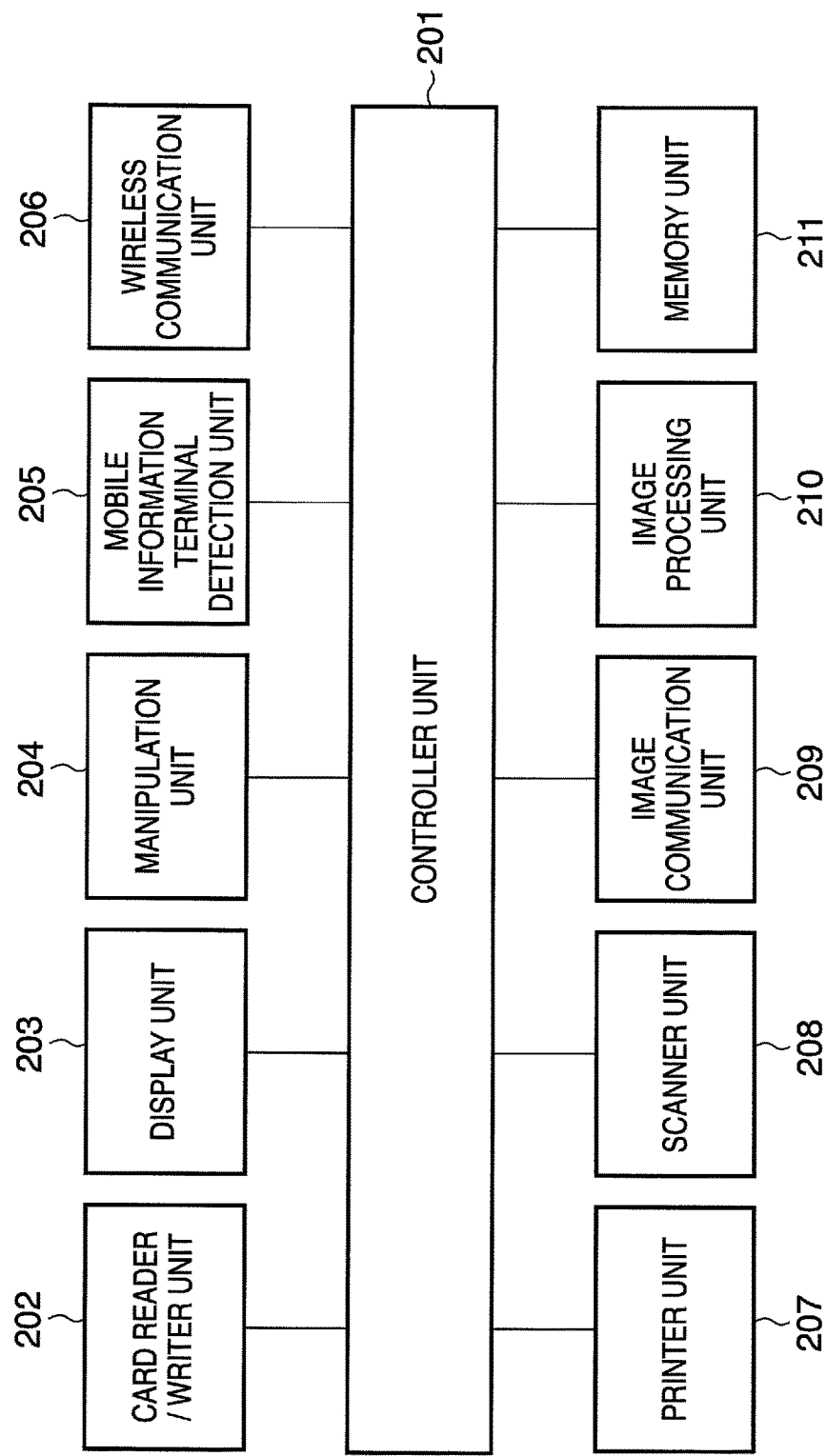
FIG. 3 is a block diagram showing the hardware arrangement of the image processing apparatus according to the first embodiment.

FIG. 3 is a block diagram showing the hardware arrangement of the image processing apparatus 100 according to this embodiment. As the image processing apparatus 100, a multi-functional peripheral (MFP) which comprises a copy function, printer function, FAX function, and scanner function is assumed. Referring to FIG. 3, the image processing apparatus 100 comprises a controller unit 201 which controls the overall apparatus 100. The image processing apparatus 100 includes a card reader/writer unit 202, a display unit 203 and manipulation unit 204, a mobile information terminal detection unit 205, and a wireless communication unit 206. Furthermore, the image processing apparatus 100 has a printer unit 207, scanner unit 208, image communication unit 209, image processing unit 210, and memory unit 211.

The respective units shown in FIG. 3 will be briefly described below.

The card reader/writer unit 202 allows a communication with a non-contact IC such as RFID or the like. When a non-contact ID card that records in advance login information required to log in the image processing apparatus 100 is located close to the card reader/writer unit 202, the card reader/writer unit 202 receives the login information from a non-contact IC inside the ID card. Also, the user can manually send information required to log in the apparatus to the non-contact ID card, and can write it in the non-contact ID card.

The display unit 203 is a block which displays operation instructions, a print preview of an image to be printed, and the like to the user, and comprises, e.g., a liquid crystal panel or the like as a practical example.

The manipulation unit 204 is a block that makes the user select an operation by means of a key operation, and provides a user interface used to manipulate the image processing apparatus 100. In recent years, along with an increase in size of the liquid crystal panel, a liquid crystal touch panel is implemented by integrating the display unit 203 and manipulation unit 204, and the display 101 shown in FIG. 1 is an example obtained by integrating these units.

The mobile information terminal detection unit 205 is a block which detects if the mobile information terminal 200 is placed at a predetermined position, i.e., on the expanded interface 104 in the arrangement shown in FIG. 2, and is implemented as the aforementioned sensor by various methods.

The wireless communication unit 206 is a block which makes data communications with a wireless communication device such as the mobile information terminal 200 or the like by a wireless communication system such as Bluetooth, a wireless LAN, or the like, and comprises an antenna unit, RF unit, and baseband unit. The wireless communication unit 206 makes a communication required to detect the mobile information terminal 200. More specifically, the wireless communication unit 206 acquires information required to identify the mobile information terminal 200 using a wireless communication method to be described later. After detection of the mobile information terminal 200, the wireless communication unit 206 makes data communications with the mobile information terminal 200 according to a user's operation so as to execute predetermined processing. More specifically, the wireless communication unit 206 makes communications to receive print data sent from the mobile information terminal 200, and to send data stored in the memory unit 211 to the mobile information terminal 200. After the image processing apparatus detects the mobile information terminal, the kind of processing to be executed is determined depending on the contents which are instructed by the user from a processing menu window displayed on the display unit of the image processing apparatus after the detection or a menu window displayed on the screen of the mobile information terminal.

In this embodiment, along with an increase in size of the liquid crystal panel, the display unit 203, manipulation unit 204, mobile information terminal detection unit 205, and wireless communication unit 206 are integrated to implement a wireless communication port, which is mounted back to back to the liquid crystal touch panel. That is, the expanded interface 104 shown in FIG. 2 is prepared by integrating the display unit 203, manipulation unit 204, mobile information terminal detection unit 205, and wireless communication unit 206. Therefore, the expanded interface 104 detects if the mobile information terminal 200 or the user's finger 300 is placed on the liquid crystal touch panel. Especially, upon detection of the mobile information terminal 200, the expanded interface 104 can make communications with it.

The printer unit 207 is a block which prints an electrical image signal on a print sheet as a visible image, and comprises a laser beam printer or ink-jet printer.

The scanner unit 208 is a block which optically scans an original image and converts it into an electrical image signal, and comprises a contact image sensor, scan drive unit, scan illumination control unit, and the like. Upon scanning the entire surface of an original by the contact image sensor conveyed by the scan drive unit, the scan illumination control unit executes illumination control of an LED inside the contact image sensor. At the same time, a photosensor in the contact image sensor optically scans an original image, and converts it into an electrical image signal.

The image communication unit 209 is a block which exchanges data with an external device. The image communication unit 209 connects the Internet or a LAN, makes a FAX communication by connecting a public telephone line, or connects a personal computer (PC) via a USB interface.

The image processing unit 210 is a block which executes scan image processing, communication image processing, and print image processing. The scan image processing applies shading correction and the like to image data received from the scanner unit 208, and executes gamma processing, binarization processing, halftone processing, and color conversion processing such as RGB→CMYK or the like, thus converting the image data into high-resolution image data. The print image processing applies resolution conversion to image data in correspondence with a print resolution. The print image processing applies various kinds of image processing such as variable scaling, smoothing, density correction, and the like of an image, thus converting image data into high-resolution image data, and outputting the converted data to a laser beam printer or the like. The communication image processing applies resolution conversion, color conversion, and the like according to the communication performance to the scanned image, and applies resolution conversion or the like according to the print performance to an image received via a communication.

The memory unit 211 is a memory device such as a DDR-SDRAM, HDD, or the like, and not only temporarily stores image data but also stores control programs, data, and the like used by the controller unit 201 so as to implement the functions of the image processing apparatus.

The controller unit 201 controls the overall image processing apparatus 100, is electrically connected to respective blocks such as the printer unit 207, scanner unit 208, and the like, and executes control to implement advanced functions. More specifically, the controller unit 201 serves as discrimination means, display control means, terminal type identification means, and terminal position specification means in addition to control of the aforementioned blocks by controlling the connected blocks. For example, the controller unit 201 discriminates whether or not an object placed on the expanded interface 104 is a mobile information terminal. Also, the controller unit 201 controls the display contents on the expanded interface 104 according to the discrimination result. The controller unit 201 identifies the type of the mobile information terminal placed on the expanded interface 104, and controls to display a processing menu window according to the identified type. Furthermore, the controller unit 201 specifies the contact position of the mobile information terminal placed on the expanded interface 104. The controller unit 201 controls the scanner unit 208 to scan original image data so as to implement the scan function, and also controls the printer unit 207 to output image data onto a print sheet so as to implement the copy function. The controller unit 201 provides a scanner function that sends image data scanned by the scanner unit 208 onto a network via the image communication unit 209. The controller unit 201 provides a printer function that converts code data received from a network or the like via the image communication unit 209 into image data, and outputs the image data to the printer unit 207. The controller unit 201 automatically logs in the image processing apparatus 100 using user ID information received from the non-contact ID card using the card reader/writer 202. The controller unit 201 controls the display contents to display, on the display unit 203, a list of mobile information terminals 200 which allow wireless communications by the wireless communication unit 206.

Moreover, the controller unit 201 controls the communication performance of the wireless communication unit 206 according to various states.

<Wireless Communication>

The wireless communication processing according to this embodiment will be described below taking Bluetooth as an example. Bluetooth is a short-distance wireless communication scheme aiming at wireless connections of electronic devices, and uses the frequency of the 2.4-GHz ISM frequency band, which is assigned for use in industries, science and technology, and medical services without license. Since Bluetooth is compact and lightweight, priced low, and consumes little power, it is popularly adapted as a standard for mobile information terminals.

A basic network arrangement of Bluetooth is a point-to-point connection between one master device and a maximum of seven slave devices, and is called "piconet". Furthermore, when a given slave serves as a master of another piconet, or a master serves as a slave of still another piconet, a large-scale network called scatternet which interconnects piconets can be configured. Such wireless network can be easily built or canceled automatically/semi-automatically. For this reason, this network can be used for an ad hoc communication.

Figure 4:
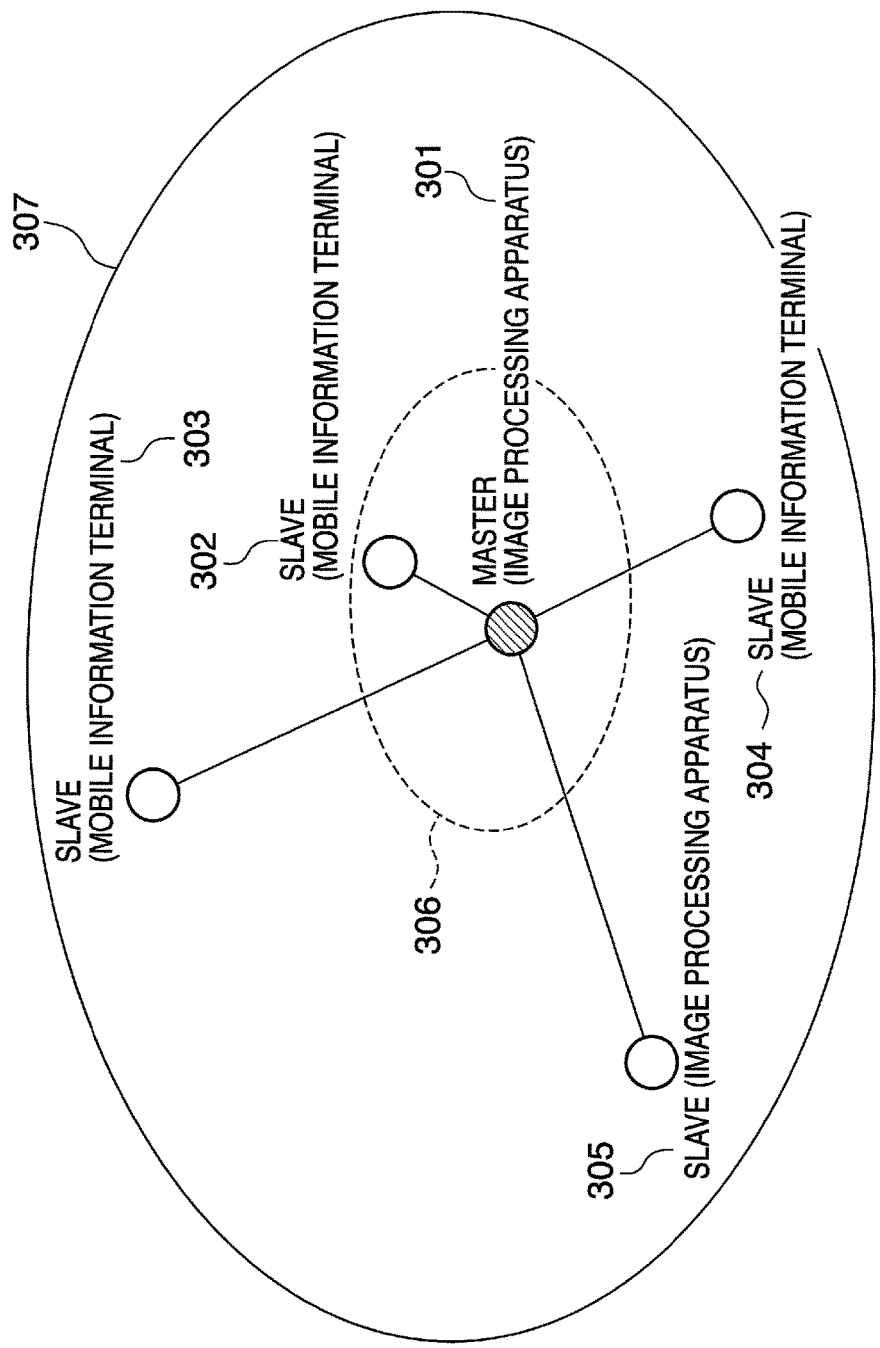
FIG. 4 shows a piconet configuration example of Bluetooth according to the first embodiment.

FIG. 4 shows a configuration example of a piconet of Bluetooth. Referring to FIG. 4, a master 301 is an image processing apparatus which serves as a master of the piconet. Slaves 303 and 304 are mobile information terminals which are not placed on the mobile information terminal putting space 202, and are located within a communication zone 307 for normal communication quality, within which communications are disabled at times of lower communication quality (to be described later) but are enabled at times of normal communication quality. A slave 302 is a mobile information terminal which is placed on the mobile information terminal putting space 202, and is located within a communication zone 306 for lower communication quality, within which communications are enabled at the time of not only normal communication quality but also lower communication quality. A slave 305 is an image processing apparatus which is different from the master 301, and can execute one job as a slave of the master 301 in this piconet by, e.g., collaboration of the two image processing apparatuses.

Figure 5:
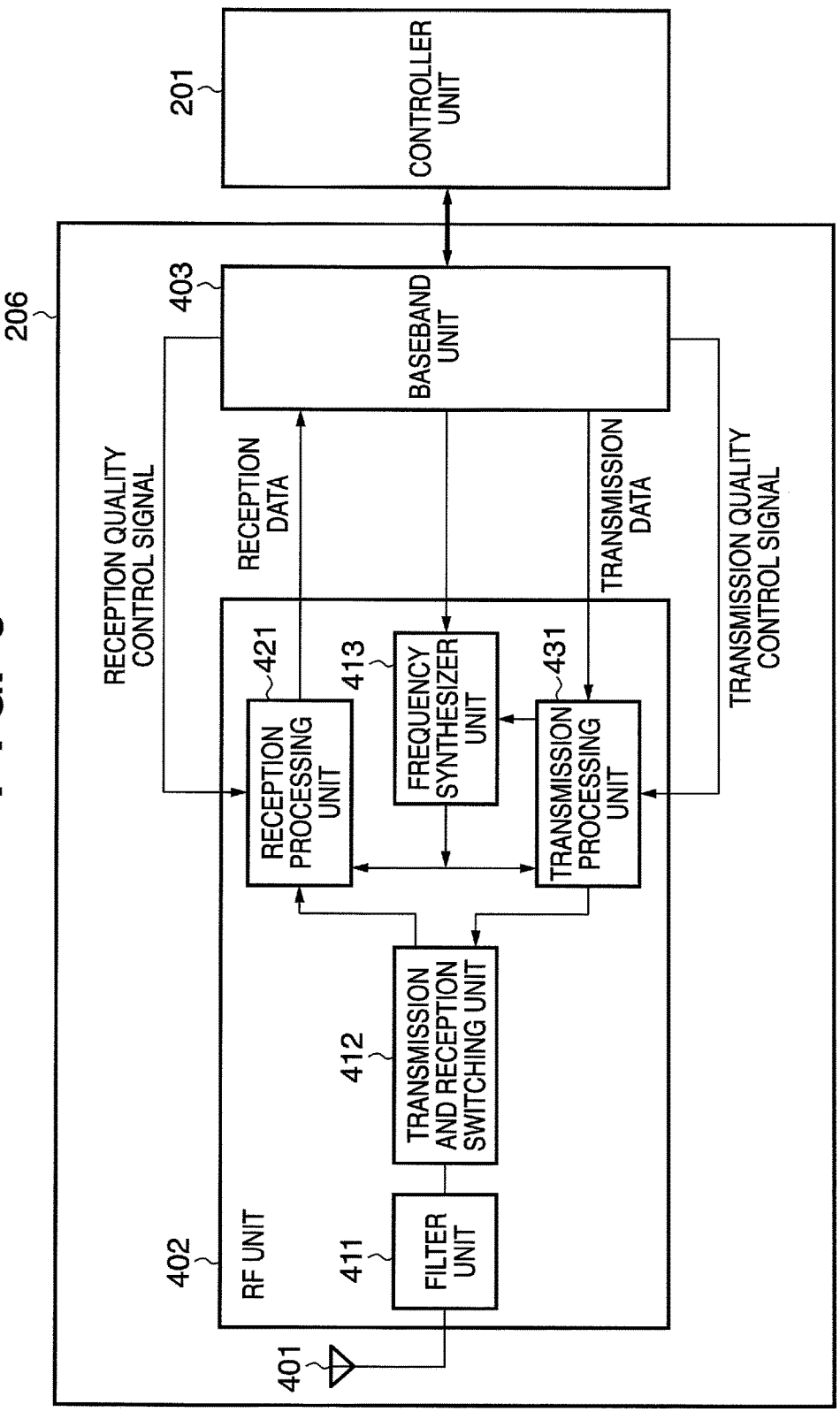
FIG. 5 is a schematic block diagram showing the arrangement of a wireless communication unit according to the first embodiment.

FIG. 5 shows a schematic arrangement of the wireless communication unit 206. The wireless communication unit 206 is roughly classified into an antenna unit 401, RF unit 402, and baseband unit 403, and respective units will be briefly described below.

The baseband unit 403 exchanges data with the controller unit 201, and establishes a communication link required to exchange data via wireless communications. At the same time, the baseband unit 403 provides, e.g., an operation management function of packet re-transmission, error correction, and frequency hopping executed by the RF unit 402, and transmits a wireless quality control signal to the RF unit 402 in response to an instruction from the controller unit 201.

The RF unit 402 comprises a transmission processing unit 431, reception processing unit 421, frequency synthesizer unit 413, transmission and reception switching unit 412, and filter unit 411. The filter unit 411 filters radio waves within a frequency band used in Bluetooth from those of various frequencies. The transmission and reception switching unit 412 is a switch that switches a transmission radio wave and reception radio wave. A communication between the master and slave in Bluetooth is basically attained by repeating transmission and reception. For this reason, since transmission and reception are not made at the same time, and an antenna can be shared, switching using such a switch is made.

The transmission processing unit 431 processes transmission packet data received from the baseband unit 403, superposes it on a transmission wave generated by the frequency synthesizer unit 413, and transmits that wave from the antenna unit 401. Also, the transmission processing unit 431 controls transmission power according to a transmission quality control signal received from the baseband unit 403. There are a total of 79 channels of the Bluetooth channel frequencies from 2402 to 2480 MHz in increments of 1 MHz, transmission and reception are switched every 625 μsec, and the transmission and reception frequencies hop to another channel upon every switching. This is to assure a connection in another channel even if an interference has occurred in a given channel, and to enhance the secrecy of communications, since radio waves for various purposes fly about within the 2.4-GHz band. The transmission frequency is specified by the oscillation frequency of the frequency synthesizer unit 413. The frequency synthesizer unit 413 receives designation of the oscillation frequency from the baseband unit 403 for every frequency hopping, and begins to oscillate at a predetermined channel frequency.

The reception processing unit 421 receives a signal of the 2.4-GHz band via the filter unit 411 from radio waves of various frequencies that have reached the antenna unit 401. Radio waves received via the filter unit 411 are input to the reception processing unit 421 via the transmission and reception switching unit 412. Note that the 2.4-GHz band includes many radio waves from other Bluetooth devices and those other than Bluetooth, and a radio wave of a desired channel frequency is selected by a superheterodyne scheme that frequency-converts a desired channel frequency into a specific intermediate frequency (IF). In this way, data superposed on the reception wave is extracted. The IF in the reception processing unit 421 is 2 MHz. Note that the frequency synthesizer unit 413 does not simultaneously make transmission and reception, as described above. For this reason, only one frequency synthesizer unit 413 suffices to be included in the RF unit 402, as shown in FIG. 5 (and FIG. 6 to be described later). After the reception processing unit 421 extracts the data from the received radio wave, it decodes the data to a digital signal, and passes the digital signal as reception packet data to the baseband unit 403. Also, the reception processing unit 421 controls the amplitude of the reception signal according to a reception quality control signal received from the baseband unit 403.

Figure 6:
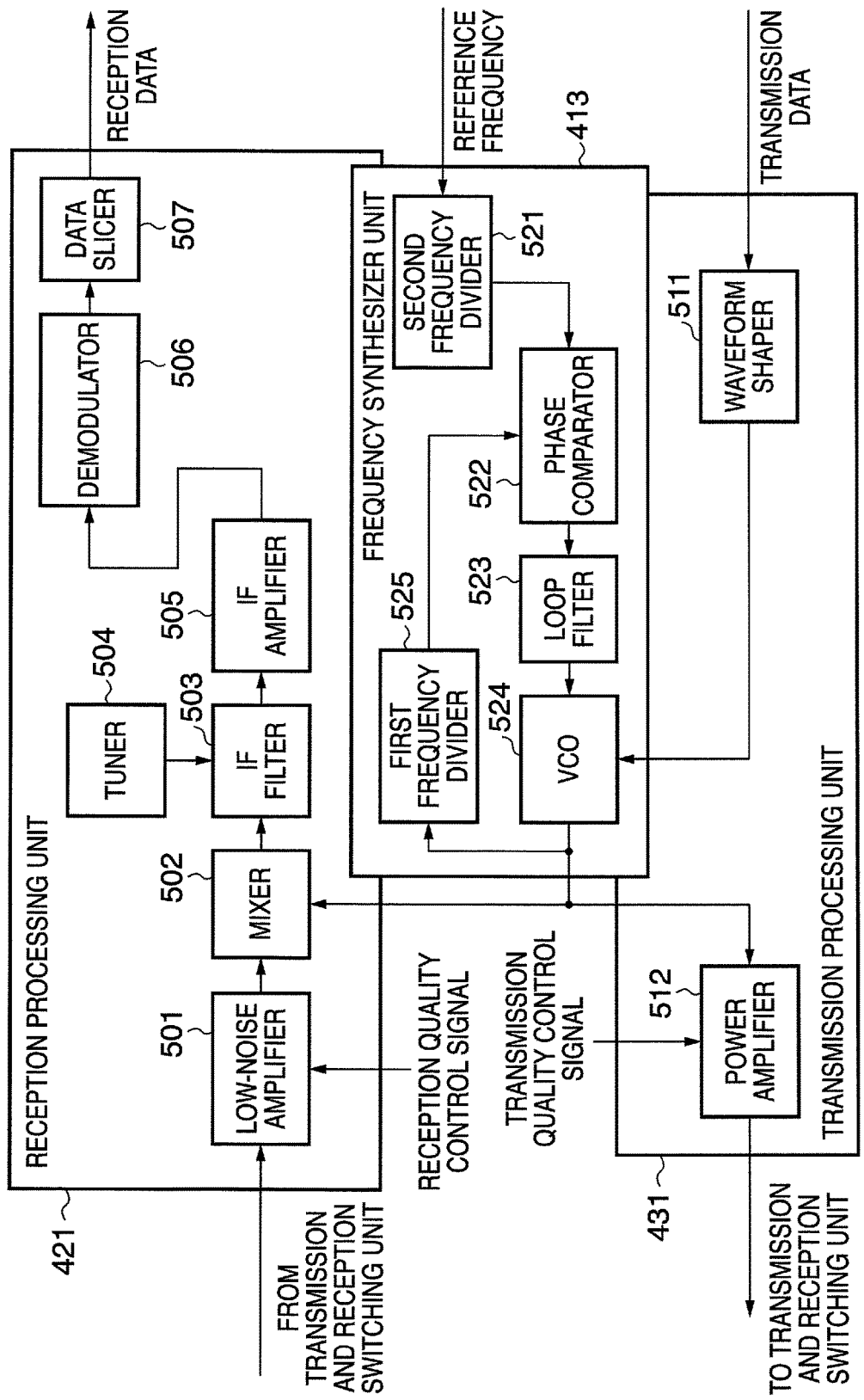
FIG. 6 is a partial block diagram showing the arrangement of an RF unit according to the first embodiment.

FIG. 6 shows the detailed arrangements of the transmission processing unit 431, reception processing unit 421, and frequency synthesizer unit 413, and these arrangements will be described below.

The arrangement of the transmission processing unit 431 will be described first. The arrangement of the transmission processing unit 431 roughly includes a waveform shaper 511 and power amplifier 512. The waveform shaper 511 removes RF components of a digital waveform from a transmission data signal (1 Mbps, digital) received from the baseband unit 403, thus outputting an analog signal including components of 1 MHz or less.

The frequency synthesizer unit 413 includes a second frequency divider 521, a phase comparator 522, loop filter 523, VCO (Voltage Controlled Oscillator) 524, and first frequency divider 525. The phase comparator 522 operates at 1 MHz. The frequency division ratio of the first frequency divider 525 assumes a designated value of the baseband unit 403 for every frequency hopping. The first frequency divider 525 frequency-divides a signal from the VCO 524 to 1 MHz, and feeds it back to the phase comparator 522, thus obtaining an oscillation output of a required frequency.

The transmission data signal which has passed through the waveform shaper 511 of the transmission processing unit 431 is input to a frequency modulation terminal of the VCO 524 to directly change the capacitance of an LC resonance circuit. As a result, the channel frequency of the transmission wave undergoes frequency modulation of about ±150 kHz. The transmission signal superposed with data is amplified by the power amplifier 512. The amplified transmission signal is transmitted from the antenna unit 401 via the transmission and reception switching unit 412 and filter unit 411. Note that the power amplifier 512 can execute power control upon transmission according to a transmission quality control signal received from the baseband unit 512. In this manner, the wireless transmission performance can be switched while assuring certain communication quality according to the state of the apparatus. In this example, the baseband unit 403 outputs the transmission quality control signal. Alternatively, the controller unit 201 may directly output this signal.

The arrangement of the reception processing unit 421 will be described below. The arrangement of the reception processing unit 421 roughly includes a low-noise amplifier 501, mixer 502, IF filter 503, tuner 504, IF amplifier 505, demodulator 506, and data slicer 507.

The low-noise amplifier 501 amplifies the power of the reception wave 25-folds. In general, the signal/noise ratio of a reception system is largely dominated by the noise factor and gain of an initial-stage amplifier, and suppression of the noise factor and optimization of the gain in the 2.4-GHz band are required. The mixer 502 multiplies the amplified reception wave and the signal from the frequency synthesizer unit 413 to convert a carrier frequency from the 2.4-GHz band to the IF of 2.0 MHz. The output from the mixer 502 includes signals of 2+1, 2, . . . MHz and so forth due to the presence of neighboring channels in addition to the target IF frequency (2 MHz). The tuner 504 fixes a central frequency so as not to be influenced by variations in the manufacture of elements which form a filter of the IF filter 503 or a change in external temperature.

The IF signal that has passed through the IF filter 503 is amplified by 40 dB by the IF amplifier 505, and is demodulated by the demodulator 506. In the demodulated signal, data of 1 Mbps is superposed as an analog waveform on a DC voltage component. The data slicer 507 extracts the DC voltage component of the demodulated waveform, and converts an analog signal part whose voltage value is higher than the DC component to High of CMOS level and a lower signal part to Low, thus converting the reception data into a digital signal. The data slicer 507 must have a function of detecting the DC component of the demodulated signal within a short period of time to cope with Bluetooth frequency hopping, and detects an appropriate DC voltage level from a demodulated signal waveform within several μsec after the start of transmission every time a partner device starts data transmission. Note that the low-noise amplifier 501 can execute reception sensitivity control upon reception in accordance with a reception quality control signal received from the baseband unit 403. With this control, the wireless reception performance can be switched while assuring certain communication quality in accordance with the state of the apparatus. In the above example, the low-noise amplifier 501 executes the reception sensitivity control. Alternatively, the reception sensitivity control may be done by changing an attenuator of the filter unit 411. In the above example, the baseband signal 403 outputs the reception quality control signal. Alternatively, the controller unit 201 may directly output this signal.

<Overview of Bluetooth>

An overview of Bluetooth will be described below.

The layer structure of Bluetooth will be described first. The layer structure includes an RF layer, baseband layer, link manager layer, L2CAP (Logical Link Control and Adaptation Protocol Specification) layer, and application layer in turn from the lowermost layer. The RF layer makes an actual wireless communication with another Bluetooth device. The baseband layer executes various kinds of processing to attain wireless control, communication processing for each link, and a communication link. The link manager layer attains establishment of a connection, control, and assurance of security upon establishment of an asynchronous (ACL) link using an LMP (Link Manager Protocol). Also, the L2CAP layer performs integration, division, and assembly of data between upper and lower layer data upon establishment of an asynchronous link, so as to achieve an efficient asynchronous packet. The application layer recognizes and confirms effective services of devices upon establishment of a Bluetooth wireless connection.

The data structure of a Bluetooth packet will be described below. This packet includes an access code field, header field, and payload field.

The access code field is configured by 72 bits to define three different types of codes, i.e., a channel access code (CAC), device access code (DAC), and inquiry access code (IAC), which are used for establishment of synchronization, offset correction, and piconet designation. The CAC is generated based on the Bluetooth address of a master for each piconet, and is used in a normal connection in a piconet. The DAC is generated from information of each Bluetooth terminal, and is used in paging or a response to paging. The IAC is generated commonly to Bluetooth or for each specific group such as a device type or the like, and is used to find an arbitrary Bluetooth device or a specific device type by issuing an inquiry. That is, if a common IAC is used, devices can generate an inquiry even if they do not know each other's Bluetooth addresses.

The header field is configured by 54 bits obtained in consideration of an error correction code of a code rate ⅓ from a total of 18 bits; 3 active member address bits, 4 type code bits, 1 flow control bit, 1 ARQN bit, 1 sequence number bit, and 8 check sum bits. The active member address indicates the destination of a packet: 0, a broadcast mode; and 1 to 7, slave numbers in a piconet. The type code indicates a packet type, and is used to classify five types for link control, four types for data transmission in case of a synchronous connection, and seven types for data transmission in case of an asynchronous connection. The flow control bit indicates NG/IL of reverse sync transmission, and is used to prevent packet collision and to avoid an idle packet output in case of an asynchronous connection. The ARQN bit is used for reception confirmation of a transmitted packet when error correction (Automatic Repeat Request) is valid; normal reception is determined if this bit is 1, or abnormal reception if it is 0. The sequence number is used to distinguish if a packet is new or is re-sent. The check sum is used for error detection of a header.

The payload field is used to store data, and the number of bits of the payload field changes depending on the packet type.

The data transmission scheme of Bluetooth will be described below. The packet communication scheme of Bluetooth includes an SCO (Synchronous Connection Oriented) and ACL (Asynchronous Connectionless).

The SCO is a symmetric communication in which the length of upstream and downstream packets is one slot, and transmission and reception intervals are constant, i.e., synchronous. There are four packet types for data transmission in case of the SCO, as described above, which are specified as HV1 (High Quality Voice1), HV2, HV3, and DV (Data Voice). HV1 can transmit real data for 80 bits as an information size by multiplying the payload length of 240 bits per packet by an error correction code (FEC) of a code rate ⅓. Likewise, HV2 can transmit real data for 160 bits by multiplying an FEC of a code rate ⅔, HV3 can transmit real data for 240 bits without any FEC, and DV can transmit 80 bits for audio data+150 bits for data as an information size. HV1 allows two-way communications at a maximum of 64 kbps, and HV3 allows those at a maximum of 192 kbps, so that these packet types are mainly used in information transmission with high realtimeness such as audio transmission or the like.

On the other hand, the ACL is an asymmetric communication in which the packet length can be selected from 1, 3, and 5 slots for each of an upstream and downstream, and can designate the SCO/ACL. There are seven packet types for data transmission in case of the ACL, as described above; they can be roughly classified into a DM (Data Medium rate) packet which multiplies an error correction code (short Humming code) of a code rate ⅔, a DH (Data High rate) packet without any error correction code, and AUX. Since the DM packet is further classified into three classes, i.e., DM1, DM3, and DM5, and the DH packet is further classified into three classes, i.e., DH1, DH3, and DH5, a total of seven packet types are provided. Except for the AUX, a 16-bit cyclic redundancy checking (CRC) code is appended to detect an information error of the payload field, and when completion of reception cannot be confirmed, a packet is re-sent (ARQ: Automatic Repeat Request). Numerals 1, 3, and 5 of respective classes of the DM and DH packets indicate the numbers of time slots occupied by one packet, and a longer payload length is assured with increasing value, since packets can be continuously output. For example, the DM1 and DH1 can output 240 bits; the DM3 and DH3, about 1500 bits; and the DM5 and DH5, about 2740 bits. Note that the AUX has a payload length of 240 bits, and has neither the CRC nor FEC. With these packets, two-way communications at a maximum of 433.9 bps (DH5) in case of symmetric types and at a maximum of 723.2 kbps vs. 57.6 kbps (DH5) in case of asymmetric types can be made. Therefore, these packets are used for connections which require a large communication capacity for one way such as browsing of WWW data, file downloading, and the like.

The master and slave states upon Bluetooth connection will be described below. Each of the master and slave states is indicated by one of the following seven states; Standby, Inquiry, Page, Active, Hold, Sniff, and Park.

The Standby state is a state of standby, and is switched to a reception state at time intervals of only 1.28 sec to attain low power consumption.

The Inquiry state is set when the master recognizes a slave. At this time, no address is assigned to the slave, and the master continuously broadcasts an IQ packet to all the slaves. Upon reception of the IQ packet, each slave stands by for a time period for a RAND frame defined by a random number, and waits until an identical IQ packet arrives again. Upon recognition of arrival of the identical IQ packet, the slave returns an FHS packet to the master as a response. In this way, the master recognizes that slave, and acquires information such as a device, address, clock, and the like of the slave.

The Page state is a state in which an ID (identification) packet is output to the designated slave. When the master transmits an ID packet (paging), the slave also returns an ID packet as a response. Upon confirmation of the paging response of the slave, the master transmits an FHS packet, and the slave acquires information such as a device, address, clock, and the like of the master. Upon reception of the FHS packet, the slave returns an ID packet as a reception response.

The Active state is a state in which the master assigns a slave number to a slave using the active member address to make an actual communication. As a result, a piconet is formed in this state.

The Hold state is one of low-power consumption states, and the master sets a hold period for a slave. The slave does not receive any packet from the master within the hold period, and transits to a standby state after an elapse of the hold period. Note that this slave can communicate with devices other than the master during the hold period.

The Sniff state is another low-power consumption state, and the slave side makes reception within only a predetermined period at predetermined time intervals. The master sets a Sniff cycle and standby slot for the slave first. The slave makes reception within only the standby slot period set for each set Sniff cycle. Since the slave ignores all packets during a period other than the receivable period, it executes fewer processes in the standby state than the Hold state, thus suppressing consumption power. This state is a standby state in which the slave joins a piconet but does not have any influence on the traffic.

The Park state is still another low-power consumption state. In this state, the master sets a Park cycle for a slave, which receives a BC (beacon channel) from the master at this cycle. Since the slave maintains synchronization with the master by means of this BC, and can receive a broadcast packet or Park change/cancel packet from the master, it is easy for the slave to join a piconet again. Normally, the Park cycle is set to be longer than the cycles of the above two low-power consumption states, thus suppressing consumption power accordingly.

In the example of the above description, Bluetooth is used as a wireless scheme that various devices and the MFP support. However, the same power control mechanism and reception sensitivity adjustment mechanism as in this embodiment can be provided for other wireless schemes.

As other wireless schemes, for example, the following schemes are available. •WiMAX (World wide Interoperability for Microwave Access) is a scheme standardized by the IEEE802.16 working group. •UWB (Ultra Wide Band) is a scheme standardized by the IEEE802.15 working group the same as Bluetooth. With this scheme, since a conventional scheme that assigns frequencies for respective use purposes suffers restrictions on resources, an ultra wide band of, e.g., 3.1 GHz to 10.6 GHz is shared by weak radio waves to make large-capacity communications. High Data Rate UWB specified by IEEE802.15.TG3a has been developed under the assumption of a data rate of IEEE802.11n (narrow band width type) or equivalent. Low Data Rate UWB specified by IEEE802.15.4a has been developed to be optimized to an ad hoc network. •WiFi (Wireless LAN) is standardized by the IEEE802.11 working group, and includes IEEE802.11b/a/g/n, etc. IEEE802.11n assumes 400 Mbps as a transmission rate.

<Image Processing Operation>

The processing in the image processing apparatus 100 of this embodiment will be described below. The controller unit 201 systematically controls the following processing.

Figure 7:
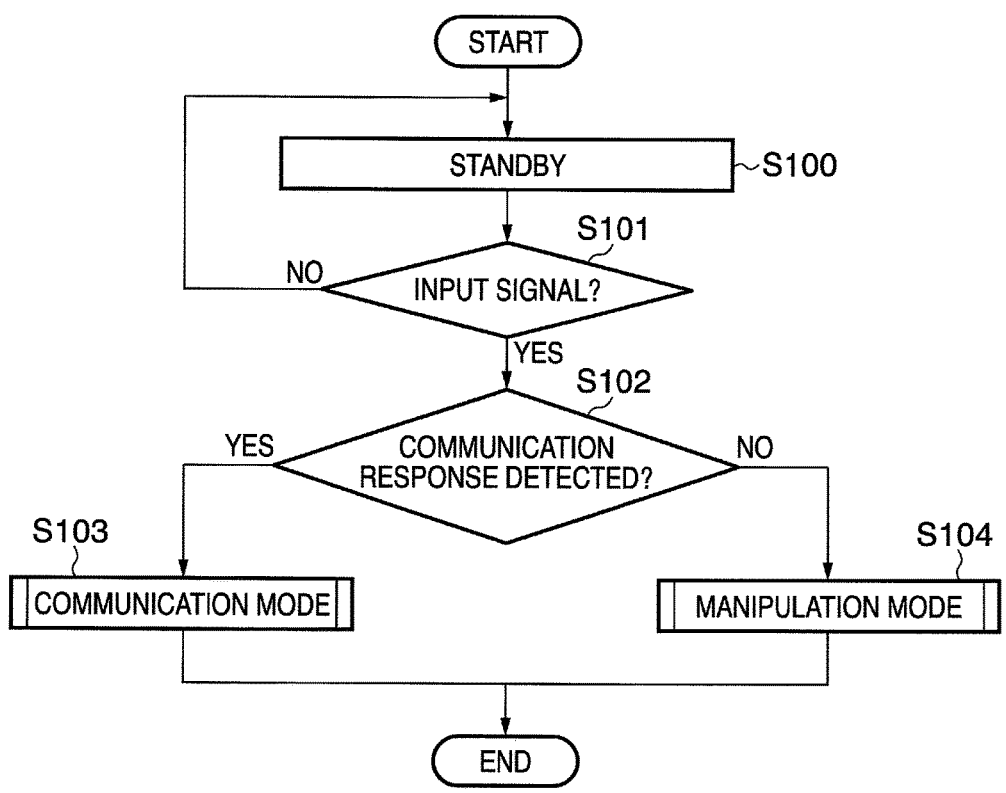
FIG. 7 is a flowchart showing the operation of the image processing apparatus according to the first embodiment.

FIG. 7 is a flowchart showing the operation of the image processing apparatus 100 of this embodiment. The image processing apparatus 100 is set in the standby state (S100) and then checks using a sensor (not shown) if an input signal is received from the expanded interface 104 as the touch panel (S101). Note that the input signal from the expanded interface 104 is generated when either the mobile information terminal 200 or the user's finger 300 is placed on the expanded interface 104. If no input signal is detected, i.e., nothing is placed on the interface 104, the process returns to step S100. On the other hand, if an input signal is detected, the controller unit 201 controls the wireless communication unit 206 to detect the presence/absence of a communication response from an object which inputs that input signal (S102). Since this communication response is generated from only the mobile information terminal 200 placed on the expanded interface 104, if the communication response is detected, the controller unit 201 determines that the object placed on the expanded interface 104 is the mobile information terminal 200, and enters a communication mode (S103). On the other hand, if no communication response is detected, the controller unit 201 determines that the object placed on the expanded interface 104 is the user's finger 300, and enters a manipulation mode (S104).

FIG. 8 is a flowchart showing an operation example in the communication mode in step S103. The controller unit 201 forms a piconet with the mobile information terminal 200 placed on the expanded interface 104 (S400). As a result, the piconet allows communications between the mobile information terminal 200 and image processing apparatus 100 so as to execute desired image processing. The controller unit 201 detects using a sensor (not shown) if the mobile information terminal 200 is removed from the expanded interface 104 (S401). If the mobile information terminal 200 is not removed, the process returns to step S401; otherwise, the piconet is released (S402).

Figure 9:
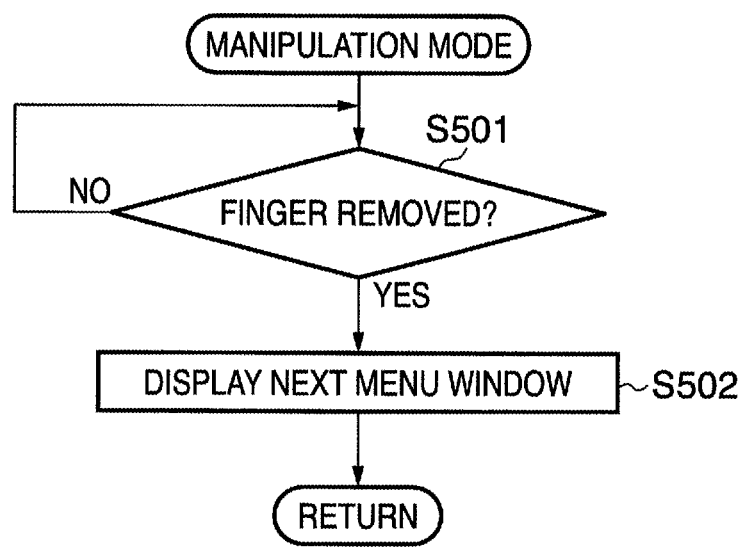
FIG. 9 is a flowchart showing an operation example in a manipulation mode according to the first embodiment.

FIG. 9 is a flowchart showing an operation example in the manipulation mode in step S104. The controller unit 201 detects using a sensor (not shown) if the user's finger 300 is removed from the expanded interface 104 (S501). If the finger is not removed, the process returns to step S501; otherwise, a next menu window associated with a screen area touched with the finger 300 is displayed on the expanded interface 104 (S502).

Figure 10:
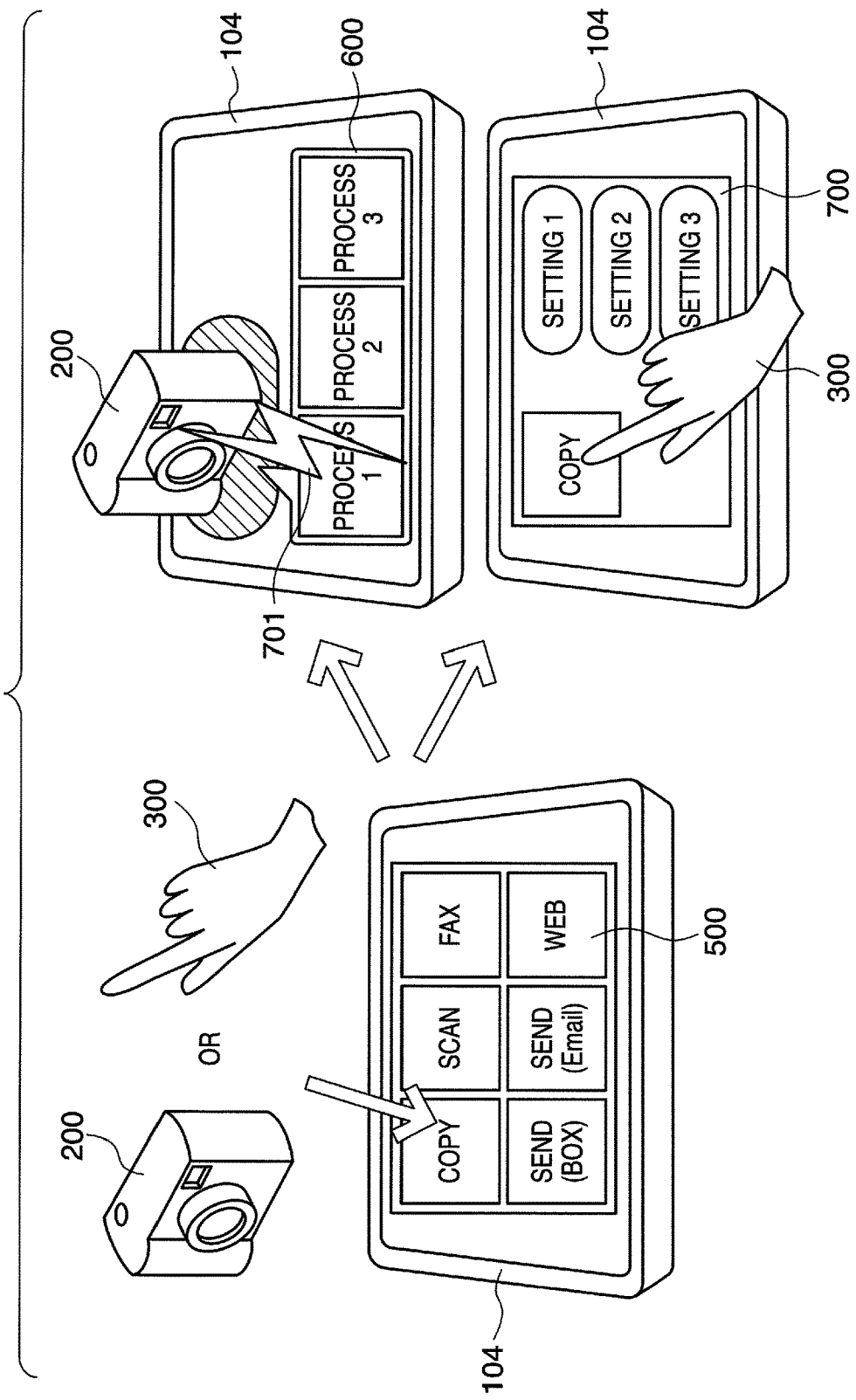
FIG. 10 is a view showing an overview of operations in respective operation modes according to the first embodiment.

FIG. 10 shows the concept upon transition to the communication mode (S103) and manipulation mode (S104). As shown in FIG. 10, one of the mobile information terminal 200 and the user's finger 300 is placed on the expanded interface 104 which displays a default manipulation menu (window) 500. At this time, for example, when the mobile information terminal 200 is placed on a "COPY" display part on the manipulation menu 500, since a communication response 701 is returned from the mobile information terminal 200 in step S102, the control enters the communication mode in step S103. Then, a processing menu (window) 600 is displayed on the expanded interface 104 to allow the user to select various processing modes ("process 1", "process 2", and "process 3" shown in FIG. 10) premised on communications between the mobile information terminal 200 and image processing apparatus 100.

On the other hand, when the user's finger 300 is placed on the "COPY" display part on the manipulation menu 500, since no communication response is returned in step S102, the controller unit 201 determines that the user inputs a copy processing instruction, and enters the manipulation mode in step S104. Then, a copy manipulation menu 700 for various operation settings required for copy processing is displayed on the expanded interface 104.

As described above, according to this embodiment, by automatically discriminating whether an object placed on the expanded interface 104 is the mobile information terminal 200 or user's finger 300, an appropriate display can be made on the expanded interface 104. For example, when the mobile information terminal 200 is placed on a function selection menu button displayed on the expanded interface 104, "placement of the mobile information terminal" and "pressing of the function selection menu button" can be correctly recognized in real time. Then, a menu display can be appropriately switched according to the recognition result.

Second Embodiment

The second embodiment according to the present invention will be described hereinafter. Since an image processing apparatus of the second embodiment has the same arrangement as that of the first embodiment, a detailed description thereof will not be given, and only differences will be explained.

Figure 12:
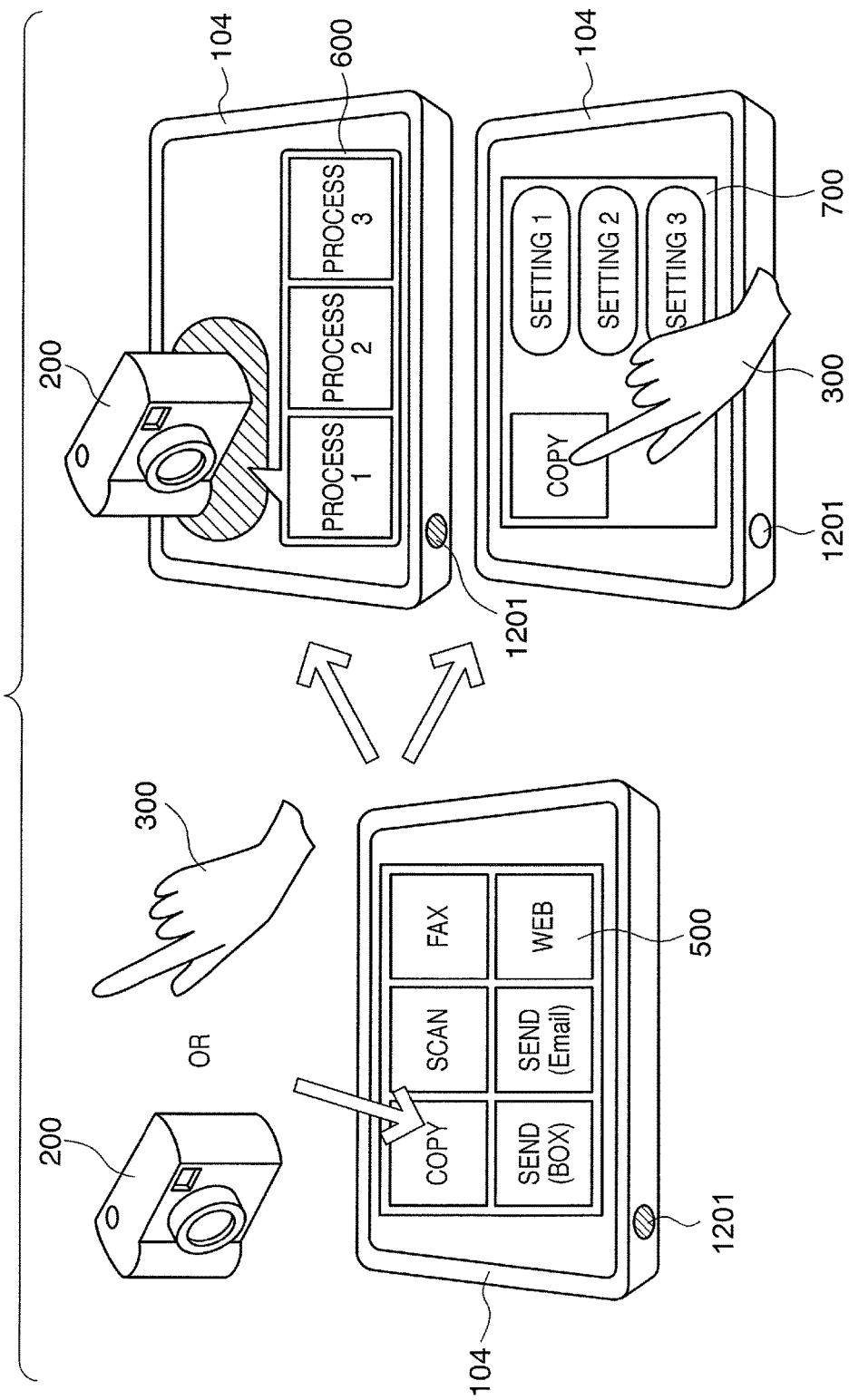
FIG. 12 is a view showing an overview of operations in respective operation modes according to the second embodiment.

In the second embodiment, as shown in FIG. 12, the expanded interface 104 of the image processing apparatus 100 described in the first embodiment comprises a mode key 1201 as a hardware key which serves as mode selection unit and is used to input a switching instruction of the operation mode. That is, the user sets ON/OFF of the communication mode using this mode key 1201, and if the mode key 1201 is ON, the communication mode is designated; otherwise, it is canceled.

Figure 11:
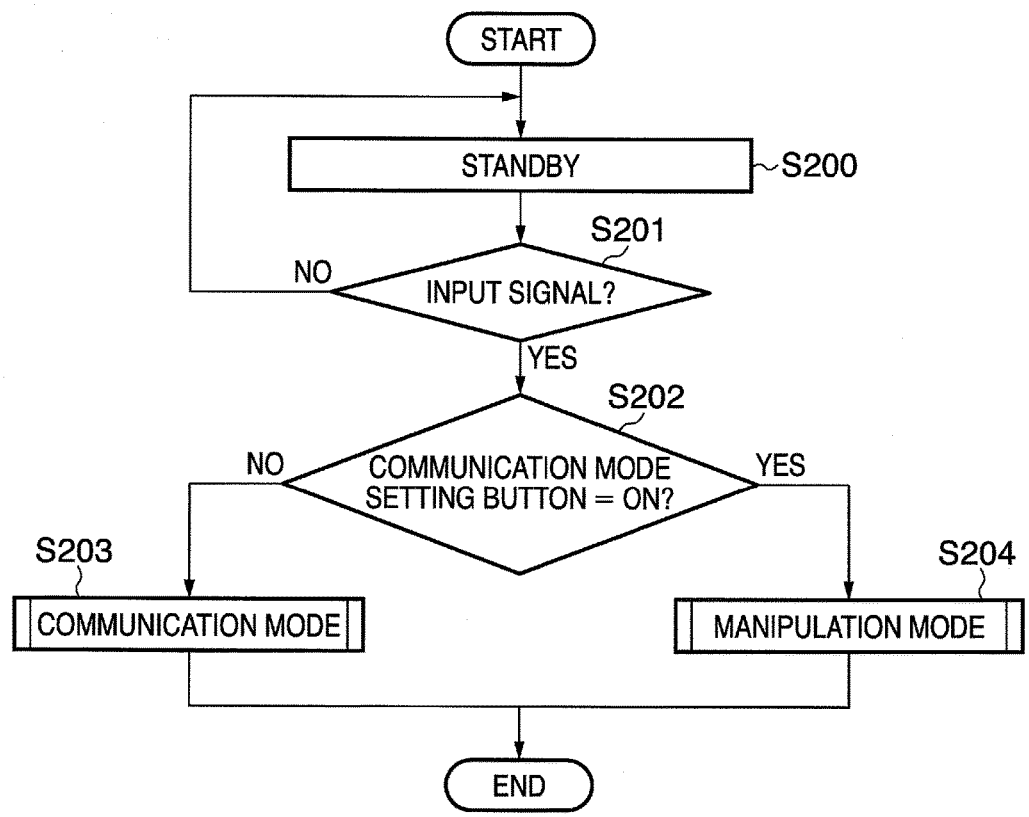
FIG. 11 is a flowchart showing the operation of an image processing apparatus according to the second embodiment.

FIG. 11 is a flowchart showing the operation of the image processing apparatus 100 of the second embodiment. The image processing apparatus 100 is set in the standby state (S200) and then checks using a sensor (not shown) if an input signal is received from the expanded interface 104 as the touch panel (S201). Note that the input signal from the expanded interface 104 is generated when either the mobile information terminal 200 or the user's finger 300 is placed on the expanded interface 104. If no input signal is detected, i.e., nothing is placed on the interface 104, the process returns to step S200. On the other hand, if an input signal is detected, the controller unit 201 detects the setting value of the mode key 1201 (S202). If the communication mode setting is ON, the controller unit 201 enters the communication mode (S203); otherwise, it enters the manipulation mode (S204).

FIG. 12 shows the concept upon transition to the communication mode (S203) and manipulation mode (S204) in the second embodiment. One of the mobile information terminal 200 and the user's finger 300 is placed on the expanded interface 104 which displays the default manipulation menu 500. At this time, if the mode key 1201 is ON, the controller unit 201 determines in step S202 that the communication mode is ON without confirming a communication response from the mobile information terminal 200, and enters the communication mode in step S203. Then, the processing menu 600 is displayed on the expanded interface 104 to allow the user to select various processing modes ("process 1", "process 2", and "process 3" shown in FIG.

12) premised on communications between the mobile information terminal 200 and image processing apparatus 100.

On the other hand, if the mode key 1201 is OFF, the controller unit 201 determines in step S202 that the communication mode is OFF, and enters the manipulation mode in step S204. Then, the copy manipulation menu 700 for various operation settings required for copy processing is displayed on the expanded interface 104.

In the example of FIG. 11, if the mode key 1201 is ON, the control unconditionally enters the communication mode, and displays the processing menu 600. However, even when the mode key is ON, the user's finger may often be placed on the expanded interface 104. In this case, if the processing menu 600 is displayed under only the condition that the mode key 1201 is ON, an insignificant window is displayed. Hence, if the mode key 1201 is ON, the process may advance to a communication determination mode in place of unconditionally entering the communication mode. More specifically, if the controller unit 201 determines in step S202 that the mode key is ON, the process advances to step S102 in FIG. 7. Then, the controller unit 201 detects the presence/absence of a communication response from an object which inputs the input signal. Subsequent processes are the same as those described with reference to FIGS. 7 to 9.

As described above, according to the second embodiment, an operation mode to be started upon detection of an input from the expanded interface 104 is discriminated based on the setting of the mode key 1201, thus allowing an appropriate display on the expanded interface 104.

Third Embodiment

The third embodiment according to the present invention will be described hereinafter. Since an image processing apparatus of the third embodiment has the same arrangement as that of the first embodiment, a detailed description thereof will not be given, and only differences will be explained.

Figure 14:
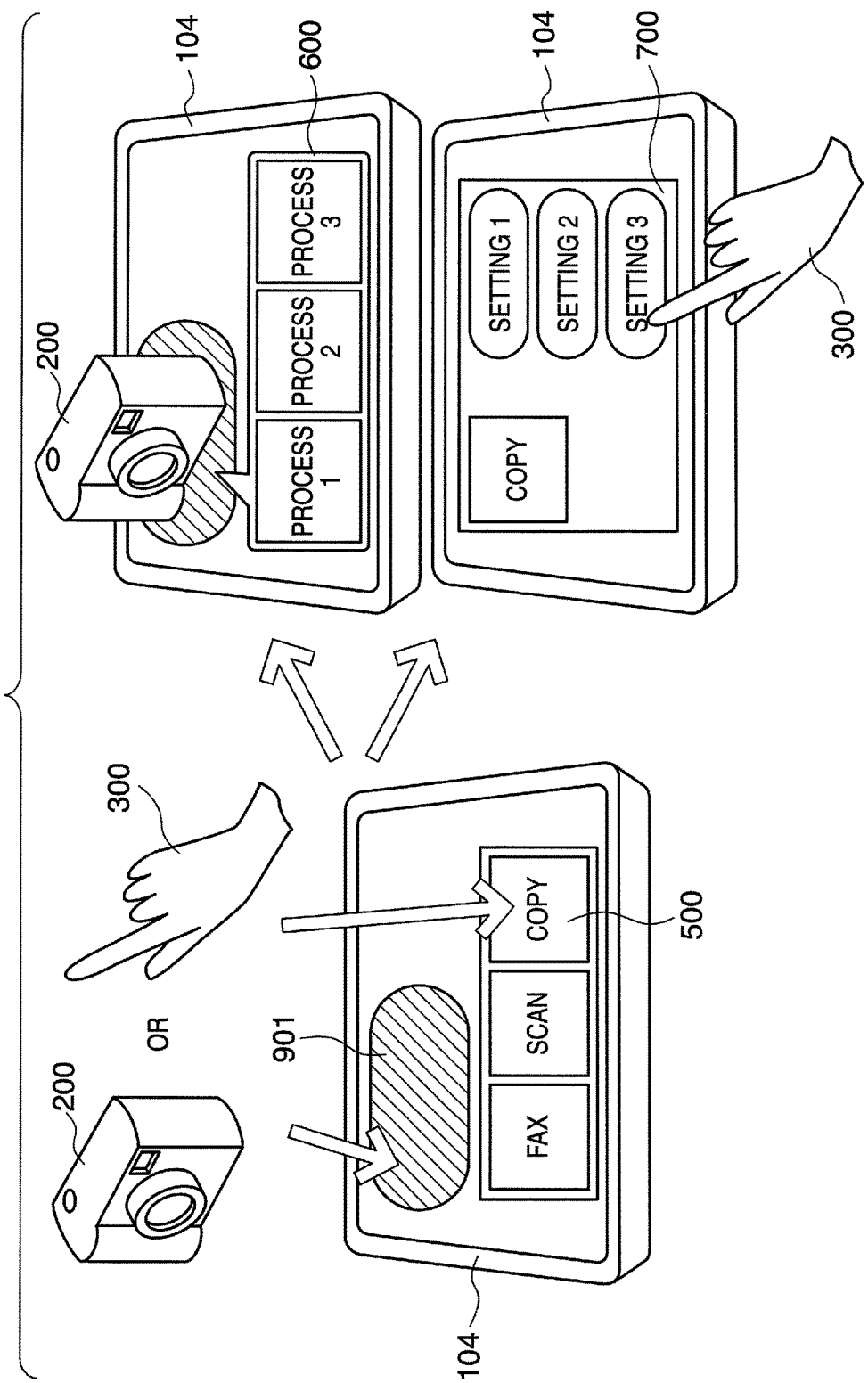
FIG. 14 is a view showing an overview of operations in respective operation modes according to the third embodiment.

The third embodiment is characterized in that the expanded interface 104 of the image processing apparatus 100 described in the first embodiment comprises a communication area 901 on its surface, as shown in FIG. 14. More specifically, if an input signal from the expanded interface 104 is generated within the communication area 901, the controller unit 201 determines that the mobile information terminal 200 is placed at a predetermined position, and enters the communication mode; otherwise, it enters a normal manipulation mode.

Figure 13:
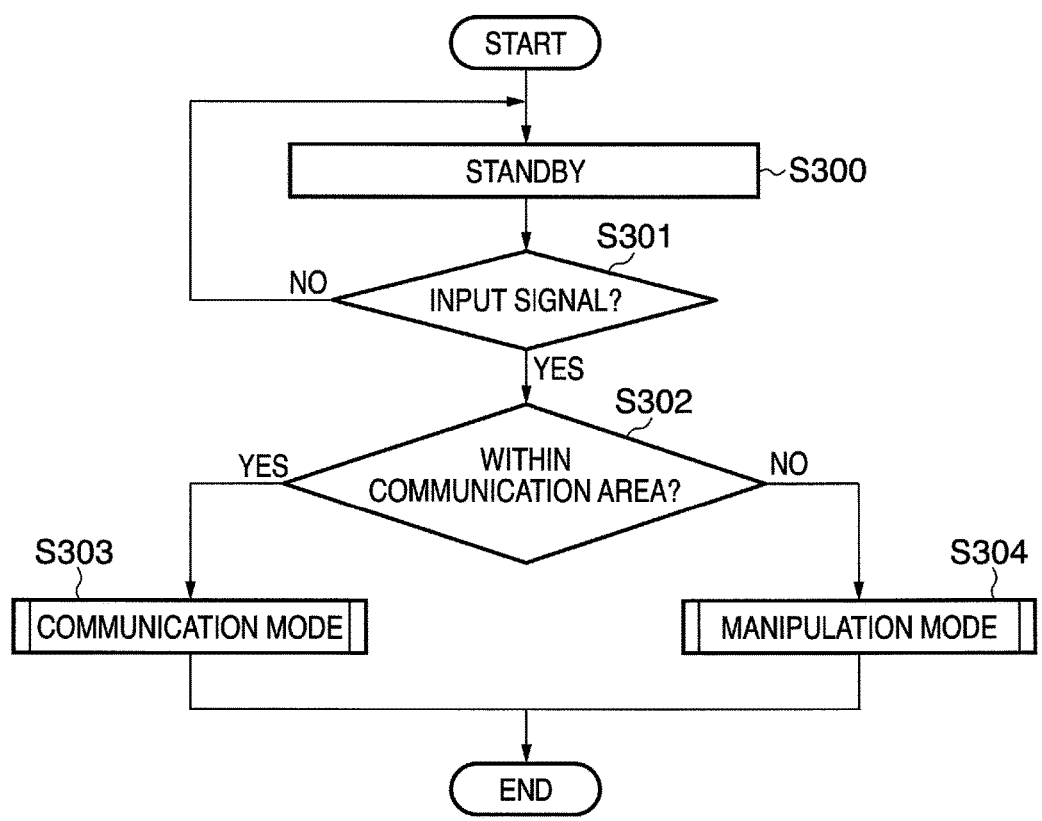
FIG. 13 is a flowchart showing the operation of an image processing apparatus according to the third embodiment.

FIG. 13 is a flowchart showing the operation of the image processing apparatus 100 of the third embodiment. The image processing apparatus 100 is set in the standby state (S300) and then checks using a sensor (not shown) if an input signal is received from the expanded interface 104 as the touch panel (S301). Note that the input signal from the expanded interface 104 is generated when either the mobile information terminal 200 or the user's finger 300 is placed on the expanded interface 104. If no input signal is detected, i.e., nothing is placed on the interface 104, the process returns to step S300. On the other hand, if an input signal is detected, the controller unit 201 determines if the position of an object which inputs the input signal is located within the predetermined communication area 901 (S302). If the position of the object is located within the communication area 901, the controller unit 201 determines that the mobile information terminal 200 is placed on the expanded interface 104, and enters the communication mode (S303). On the other hand, if the position of the object is not located within the communication area 901, the controller unit 201 determines that the user's finger 300 is placed on the expanded interface 104, and enters the manipulation mode (S304).

FIG. 14 shows the concept upon transition to the communication mode (S303) and manipulation mode (S304) in the second embodiment. One of the mobile information terminal 200 and the user's finger 300 is placed on the expanded interface 104 which displays the default manipulation menu 500. At this time, if one of these objects is placed on the communication area 901 in the expanded interface 104, the controller unit 201 determines that the mobile information terminal 200 is placed, and enters the communication mode in step S303. Then, the processing menu 600 is displayed on the expanded interface 104 to allow the user to select various processing modes ("process 1", "process 2", and "process 3" shown in FIG. 14) premised on communications between the mobile information terminal 200 and image processing apparatus 100.

On the other hand, if the object is placed on, e.g., a "COPY" button outside the communication area 901, the controller unit 201 determines that the user's finger 300 is placed, and enters the manipulation mode in step S304. Then, the copy manipulation menu 700 for various operation settings required for copy processing is displayed on the expanded interface 104.

In the example of FIG. 13, when the position of the object which inputs the input signal is located within the communication area 901, the control unconditionally enters the communication mode irrespective of the type of object, and the processing menu 600 is displayed. However, the user's finger may often be placed within the communication area 901. In this case, if the processing menu 600 is displayed under only the condition that the position of the object (the finger in this case) that inputs the input signal is located within the communication area, an insignificant window is displayed. Hence, if the position of the object that inputs the input signal is located within the communication area 901, the control may advance to a communication determination mode, in place of unconditionally entering the communication mode. More specifically, if the controller unit 201 determines in step S302 that the position of the object which inputs the input signal is located within the predetermined communication area 901, the process advances to step S102 in FIG. 7. Then, the controller unit 201 detects the presence/absence of a communication response from an object which inputs the input signal. Subsequent processes are the same as those described with reference to FIGS. 7 to 9.

As described above, according to the third embodiment, whether an object placed on the expanded interface is the mobile information terminal 200 or user's finger 300 is discriminated depending on its position, thus allowing an appropriate display on the expanded interface 104.

Fourth Embodiment

The fourth embodiment according to the present invention will be described hereinafter. Since an image processing apparatus of the fourth embodiment has the same arrangement as that of the first embodiment, a detailed description thereof will not be given, and only differences will be explained.

In the examples of the first to third embodiments described above, in the image processing apparatus 100, the display unit 203, manipulation unit 204, and mobile information terminal detection unit 205 are integrated by the expanded interface 104 as a touch panel UI. That is, the putting space of the mobile information terminal 200 is assured on the touch panel UI. In this case, the processing menu for data input from the mobile information terminal 200 placed on the touch panel UI must be displayed on the touch panel UI. If an area used to display this processing menu on the touch panel UI is fixed at a predetermined position, the display control of the processing menu becomes easy. However, if the display area of the processing menu is fixed, an area available for the putting space of the mobile information terminal 200 on the touch panel UI is limited, resulting in a low degree of freedom when the user places the mobile information terminal 200.

When a plurality of mobile information terminals are placed on the touch panel UI, mobile information terminal types corresponding to respective processing menus may be displayed so as to associate the mobile information terminals with the processing menus. However, according to this display method, the display processing becomes complicated. In addition, when a plurality of mobile information terminals of the same type are placed, the correspondence between each individual mobile information terminal and the processing menu becomes unclear.

In the fourth embodiment, the processing menu display processing on the expanded interface 104 executed in the communication mode in the first to third embodiments, i.e., when the mobile information terminal 200 is placed on the expanded interface 104 will be described.

Figure 15:
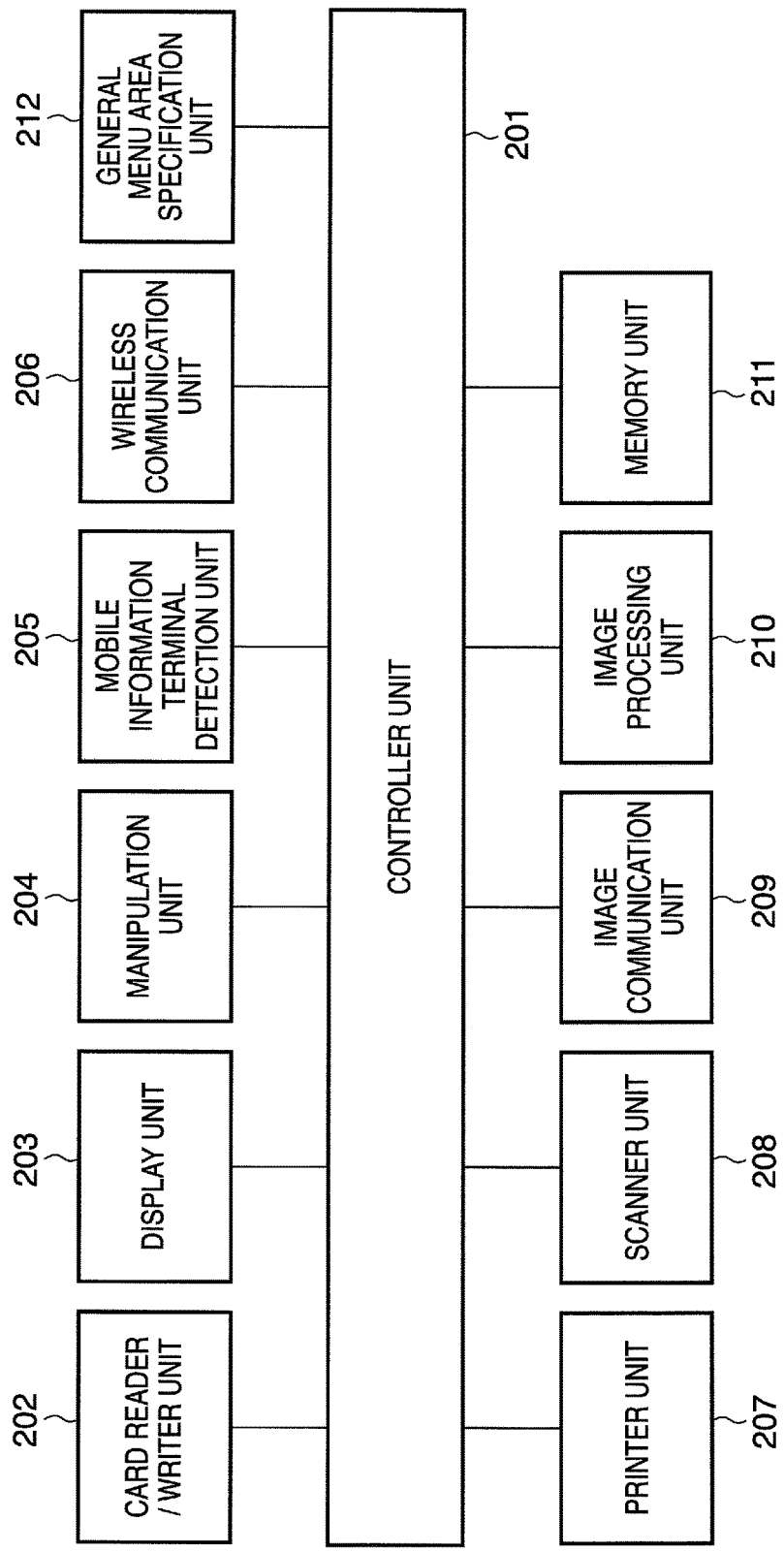
FIG. 15 is a block diagram showing the hardware arrangement of an image processing apparatus according to the fourth embodiment.

FIG. 15 is a block diagram showing the hardware arrangement of the image processing apparatus 100 according to the fourth embodiment. FIG. 15 is characterized in that the arrangement shown in FIG. 3 of the first embodiment further comprises a general menu area specification unit 212. Also, the controller unit 201 according to this embodiment has a function as terminal identification means that identifies the type of mobile information terminal in addition to the functions of the controller unit 201 according to the aforementioned embodiments. Furthermore, the controller unit 201 according to this embodiment has a function as terminal position specification means that specifies the contact position of the mobile information terminal on the expanded interface 104. Moreover, the controller unit 201 according to this embodiment has a function as other menu area specification means that specifies an other menu area which can display other menus (general menus) other than the processing menu for the mobile information terminal.

The general menu area specification unit 212 specifies an area that can display a predetermined general menu such as a manipulation menu and the like in a remaining area upon displaying a processing menu for the mobile information terminal 200 on the expanded interface 104. More specifically, the general menu area specification unit 212 specifies the remaining area that can display the general menu on the expanded interface 104 based on the layout position of the mobile information terminal 200 and the distance (predetermined value) between the processing menu displayed according to the terminal type and the general menu. Note that the controller unit 201 may include the function of the general menu area specification unit 212.

Figure 16:
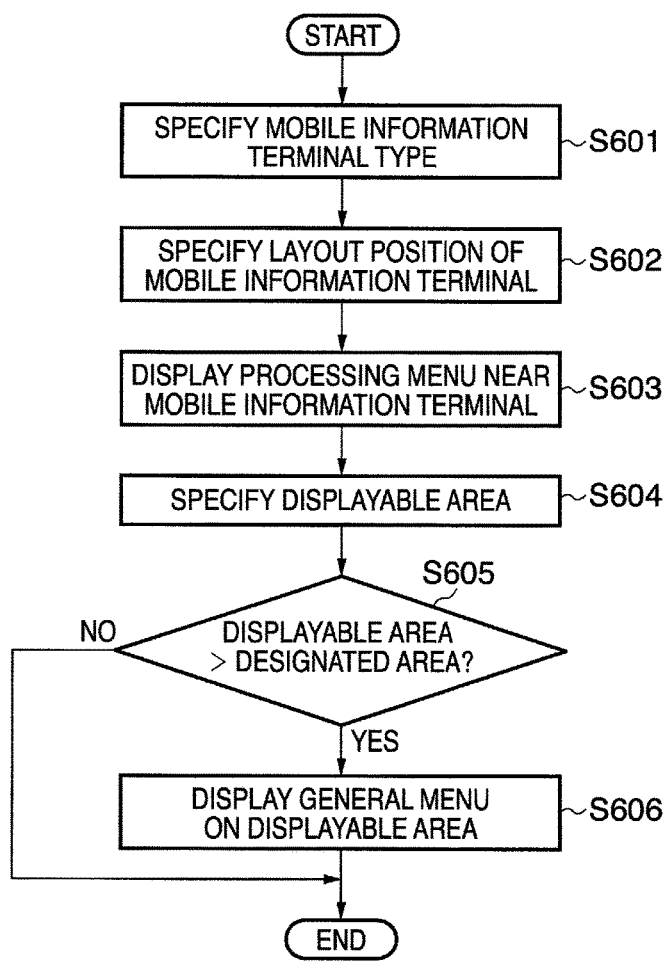
FIG. 16 is a flowchart showing the display processing in a communication mode according to the fourth embodiment.

FIG. 16 is a flowchart showing the display processing in the communication mode in the image processing apparatus 100 of the fourth embodiment.

The mobile information terminal detection unit 205 specifies the type (to be referred to as a terminal type hereinafter) of at least one mobile information terminal 200 placed on the expanded interface 104 (S601). This specification is made based on a communication response from the mobile information terminal 200. The mobile information terminal detection unit 205 further specifies a position (to be referred to as a layout position hereinafter) where the mobile information terminal 200 is placed on the expanded interface 104 (S602).

The controller unit 201 displays a processing menu for the terminal type specified in step S601 near the layout position specified in step S602 (S603). Note that the distance from the layout position to the processing menu display position is set in advance. However, the user may arbitrarily set this distance.

The general menu area specification unit 212 specifies an area that can display a general menu based on the layout position of the terminal, and the distance between the processing menu displayed according to the terminal type and a general menu display position designated in advance (S604).

The controller unit 201 checks if the area (size) of the general menu display area is larger than a threshold which is set in advance by the user (S605). Only when the size is larger than the threshold, the controller unit 201 displays a general menu (S606). That is, if the size of the general menu display area is smaller than the threshold, the controller unit 201 does not display any general menu.

Note that the size of the general menu to be displayed may be changed according to the size of the general menu display area.

When a plurality of mobile information terminals are placed on the expanded interface 104, the terminal types and layout positions of the respective terminals are specified, and processing menus for these terminals are displayed.

Practical display examples of the processing menu for the mobile information terminal and general manipulation menu according to the fourth embodiment will be described below.

Figure 17:
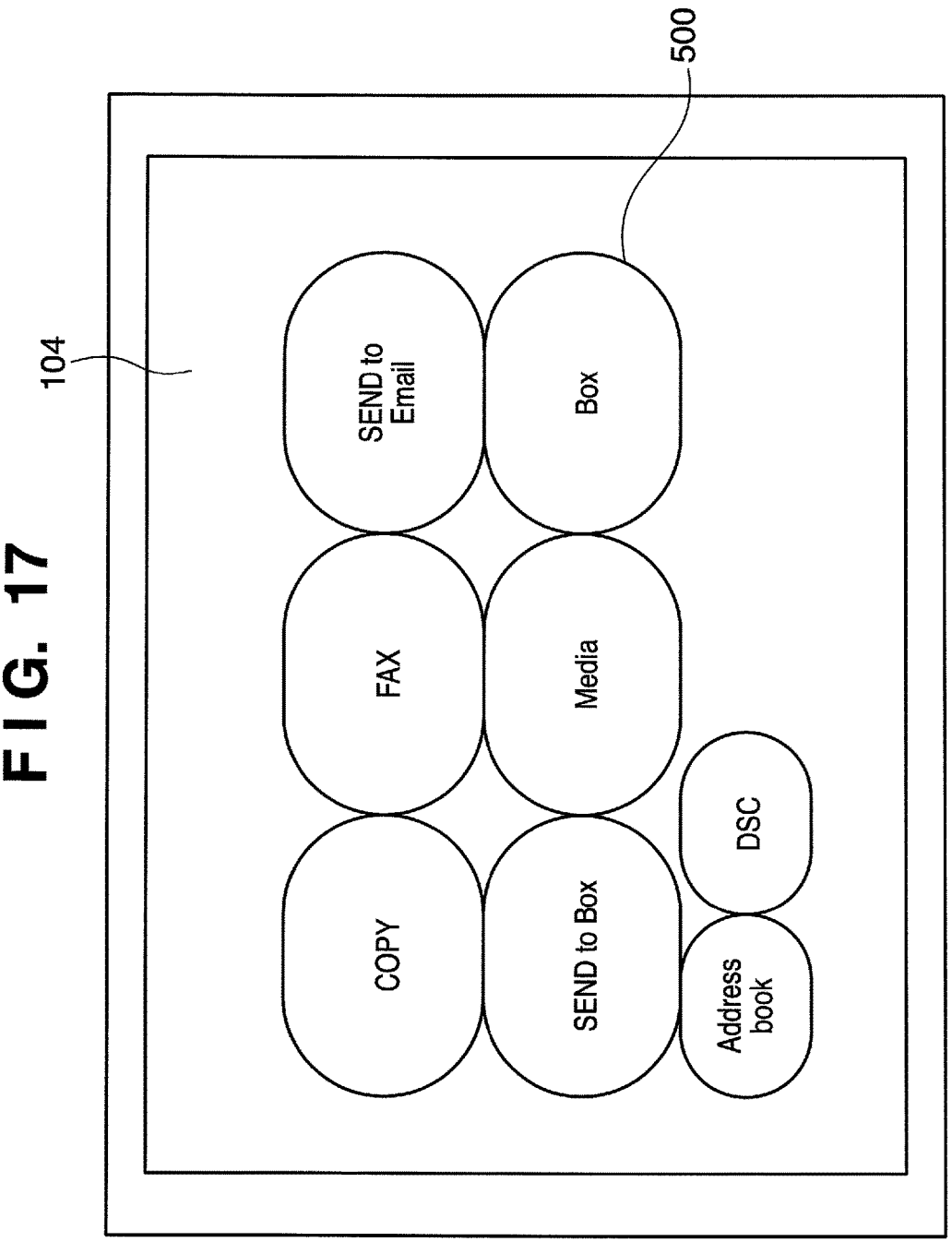
FIG. 17 shows a default general menu display example according to the fourth embodiment.
Figure 18:
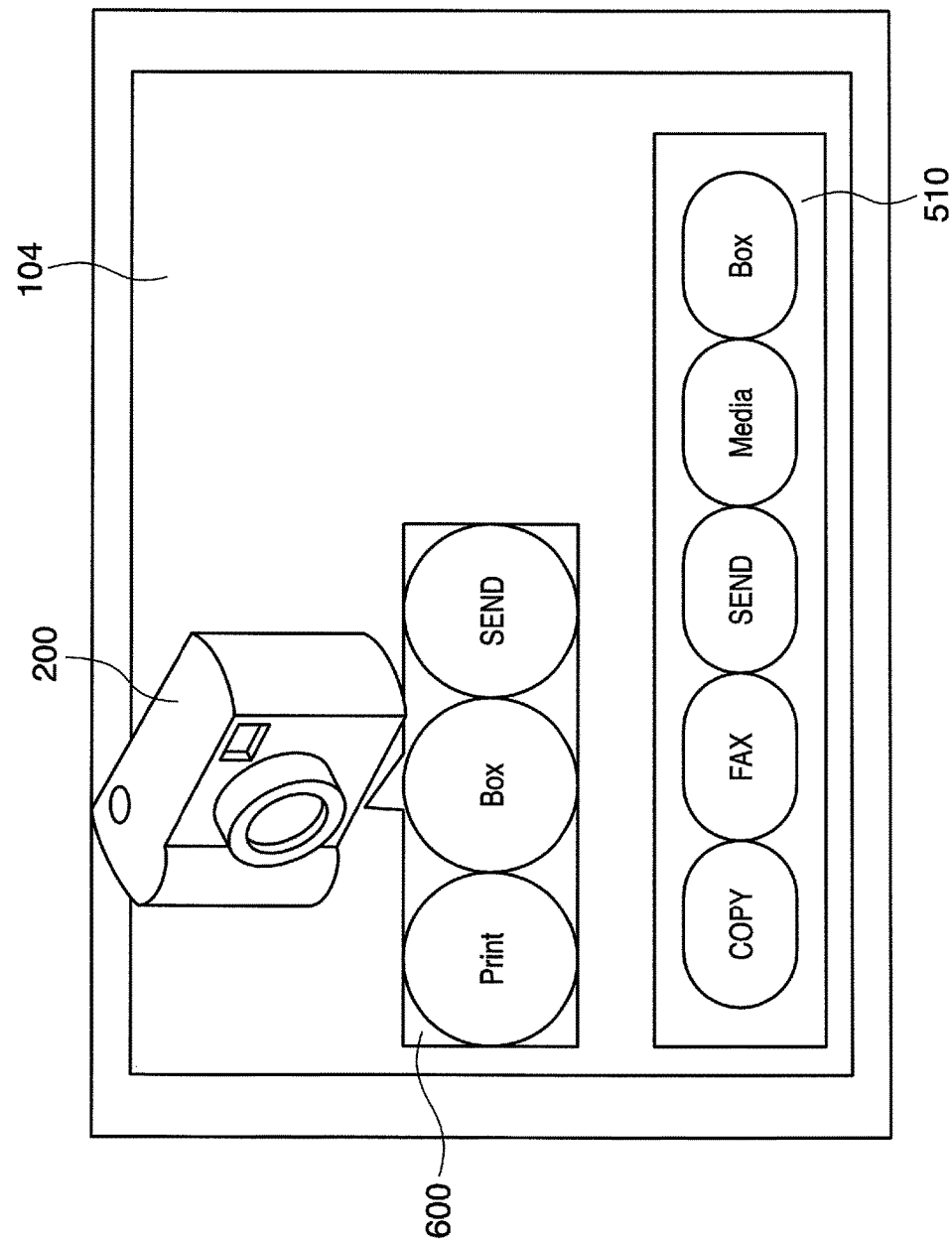
FIG. 18 shows a display transition example upon placing a mobile information terminal according to the fourth embodiment.

FIG. 17 shows a default display example on the expanded interface 104 before the mobile information terminal 200 is placed, i.e., a default display example of the general menu 500. When the mobile information terminal 200 is placed on the expanded interface 104 that displays the general menu 500 in this way, the display contents change, as shown in FIG. 18. As can be seen from FIG. 18, the processing menu 600 for the mobile information terminal 200 is displayed near that terminal, and a reduced general menu 510 obtained by reducing the general menu 500 is displayed.

Figure 19:
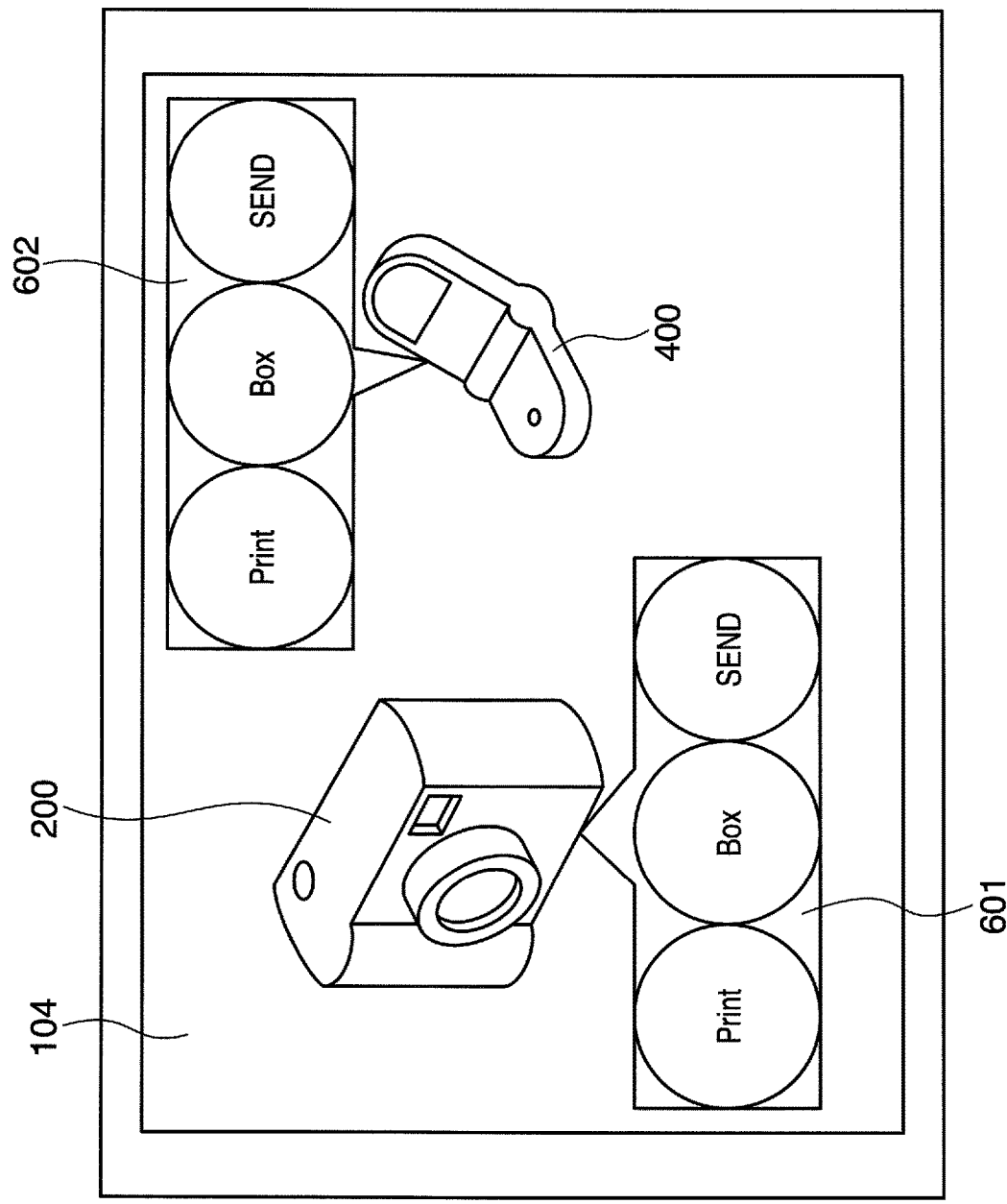
FIG. 19 shows a display transition example upon placing a plurality of mobile information terminals according to the fourth embodiment.

When a plurality of mobile information terminals (terminals 200 and 400 in this case) are placed on the expanded interface 104, processing menus (menus 601 and 602 in this case) according to the terminal types are displayed near these terminals, as shown in FIG. 19. At this time, since the remaining display area is insufficient, the general menu is not displayed. However, if the remaining display area is sufficiently large, the general menu is also displayed.

As described above, according to the fourth embodiment, processing menus for respective mobile information terminals are displayed near these terminals placed on the expanded interface 104. Therefore, even when a plurality of mobile information terminals of the same type are placed, respective processing menus can be displayed so that correspondence with the respective terminals can be recognized.

In the example of the fourth embodiment, the display positions of the processing menu for the mobile information terminal and general menu are controlled based on the terminal type and layout position of the mobile information terminal placed on the expanded interface 104. Such display position control can also be independently executed. That is, control may be made so that the processing menu according to the terminal type of the mobile information terminal 200 is displayed for each terminal, but the general menu is not displayed. Alternatively, the display position of the general menu may be controlled not to be occluded according to the layout position of the mobile information terminal 200 without displaying any processing menu for the mobile information terminal 200.

As described above, according to the fourth embodiment, the position of the mobile information terminal 200 on the expanded interface 104 is not limited. Even when a plurality of mobile information terminals are placed, processing menus corresponding to these terminals can be clearly displayed.

Fifth Embodiment

The fifth embodiment according to the present invention will be described hereinafter. Since an image processing apparatus of the fifth embodiment has the same arrangement as that of the first embodiment, a detailed description thereof will not be given, and only differences will be explained.

The aforementioned fourth embodiment has exemplified the processing menu display processing on the expanded interface 104 when the mobile information terminal 200 is placed on the expanded interface 104 which is implemented as a touch panel UI. In this case, a corresponding processing menu can be displayed near the mobile information terminal 200 placed on the expanded interface 104 without limiting its position. However, in a situation in which the position of the mobile information terminal to be placed is not limited, if a mobile information terminal with a relatively large size is placed on the expanded interface 104, it physically covers the touch panel UI surface. As a result, the display area is reduced, resulting in poor operability of the user. When a mobile information terminal larger than the touch panel UI display area is placed on the touch panel UI, no manipulation menu is displayed, and the user cannot make any manipulation. Note that a large mobile information terminal means a mobile phone with a large screen and full keyboard, PDA, notebook type personal computer, and the like herein.

Figure 20:
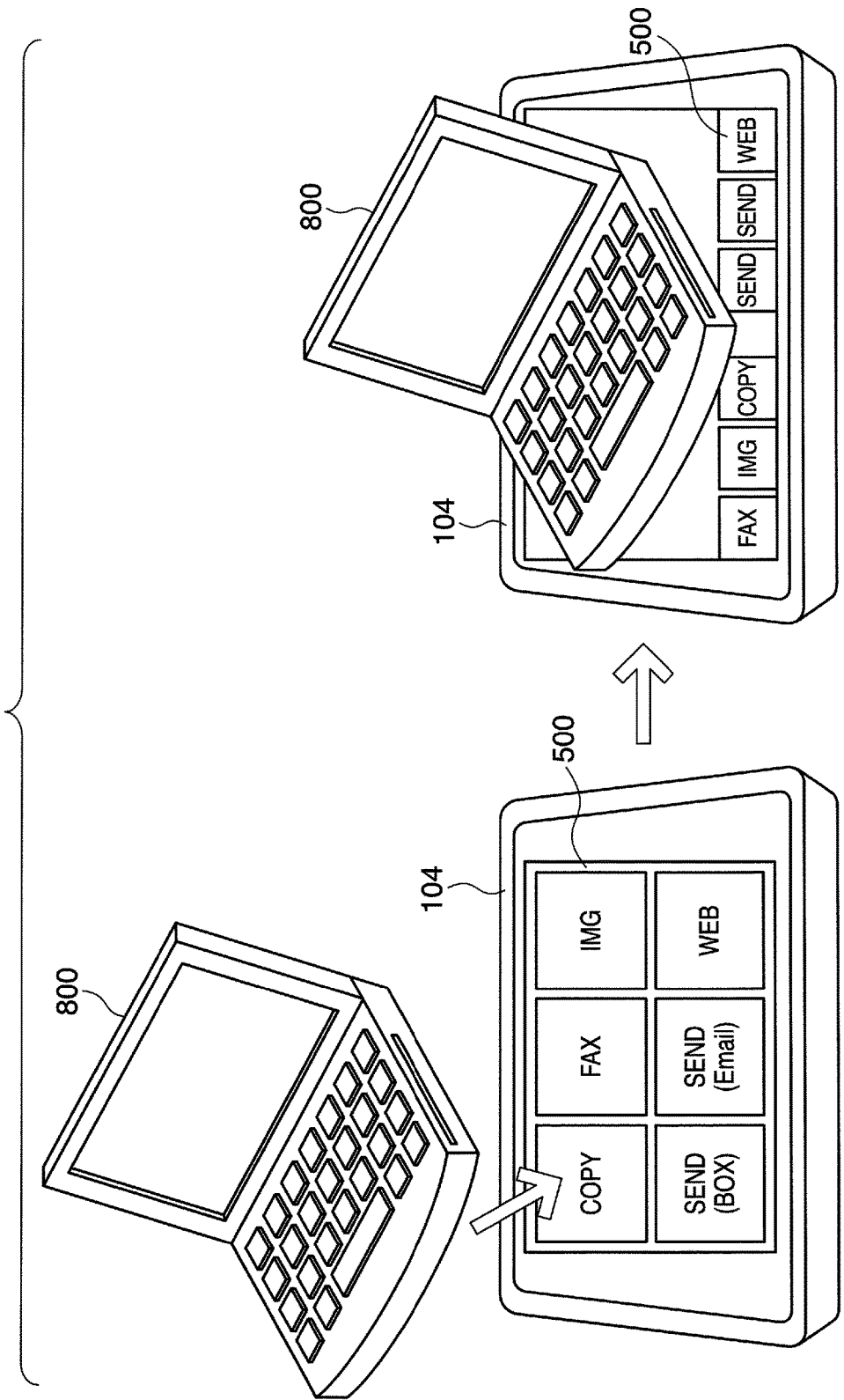
FIG. 20 shows a manipulation menu display example upon placing a relatively large mobile information terminal in the first to fourth embodiments.

FIG. 20 shows a processing menu display example when a mobile information terminal 800 which is of notebook personal computer type and has a display unit 801 is placed on the expanded interface 104. Since a relatively large mobile information terminal 800 is placed on the touch panel UI display area, the manipulation menu 500 is displayed in a reduced scale, thus impairing operability.

To solve this problem, according to the fifth embodiment, the processing menu display processing in the communication mode in the first to third embodiments, i.e., when the mobile information terminal is placed on the expanded interface 104 and the touch panel UI display area is reduced will be described below.

Figure 21:
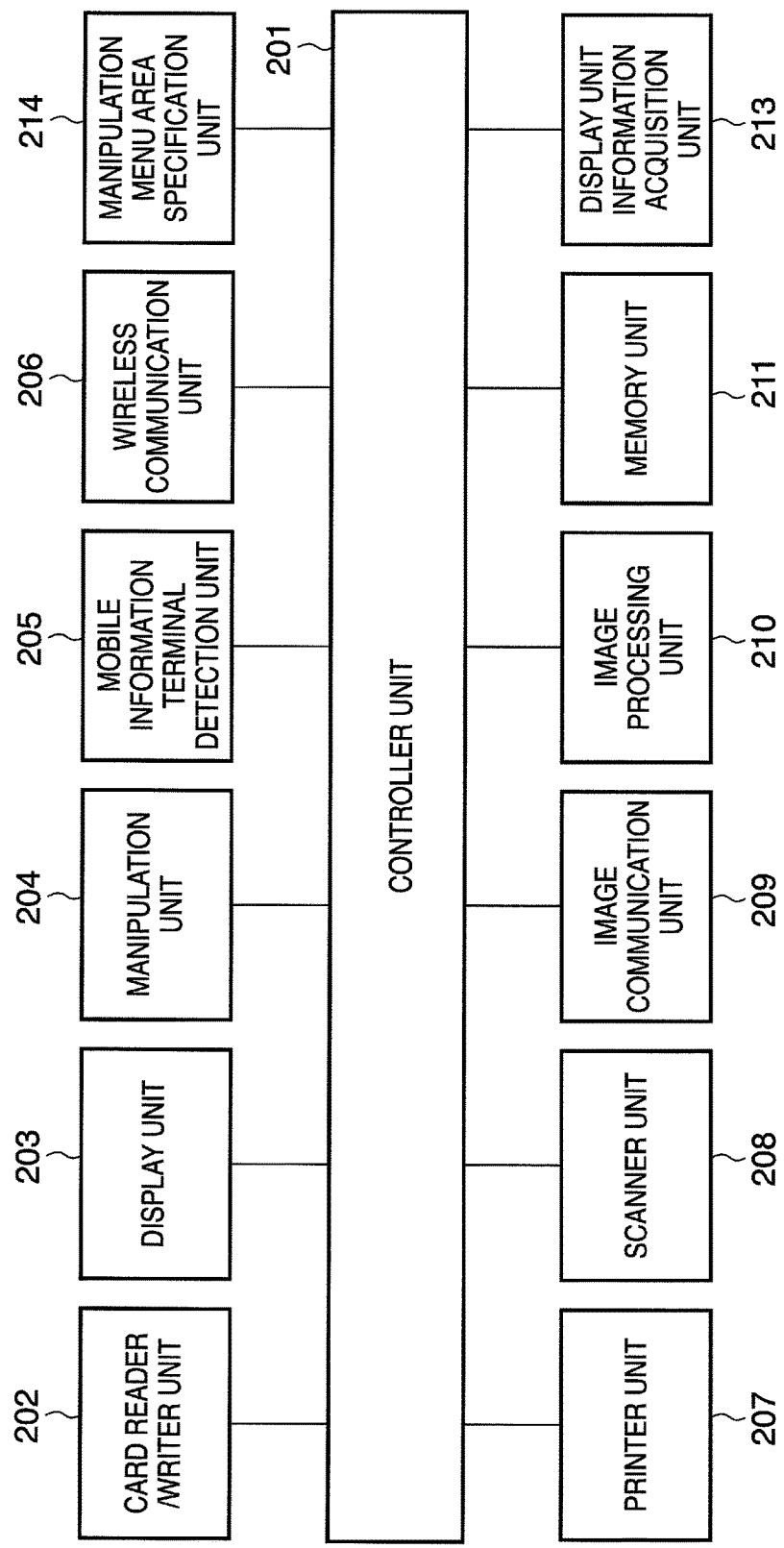
FIG. 21 is a block diagram showing the hardware arrangement of an image processing apparatus according to the fifth embodiment.

FIG. 21 is a block diagram showing the hardware arrangement of the image processing apparatus 100 according to the fifth embodiment. As shown in FIG. 21, the arrangement shown in FIG. 3 in the first embodiment further comprises a display unit information acquisition unit 213, and a manipulation menu area specification unit 214.

When the mobile information terminal detection unit 205 detects that the mobile information terminal placed on the expanded interface 104 is that having a communication response, the display unit information acquisition unit 213 acquires display unit information of the mobile information terminal 800. More specifically, the unit 213 acquires the display unit resolution of the display unit 801 with reference to a device driver setting file of the display unit 801 of the mobile information terminal 800. As another display unit information acquisition method, the unit 203 may acquire the display unit resolution using a display resolution acquisition command provided by an operating system installed in the mobile information terminal 800. Note that the mobile information terminal detection unit 205 or controller unit 201 may include the function of the display unit information acquisition unit 213.

The manipulation menu area specification unit 214 specifies a display area required to display a manipulation menu on the expanded interface 104. More specifically, the unit 214 specifies a displayable area of the manipulation menu on the expanded interface 104 based on the layout position of the mobile information terminal 200, the size of the default manipulation menu, and the size and distance (predetermined value) of a menu displayed according to the terminal type. Note that the controller unit 201 may include the function of the manipulation menu area specification unit 214.

Figure 22:
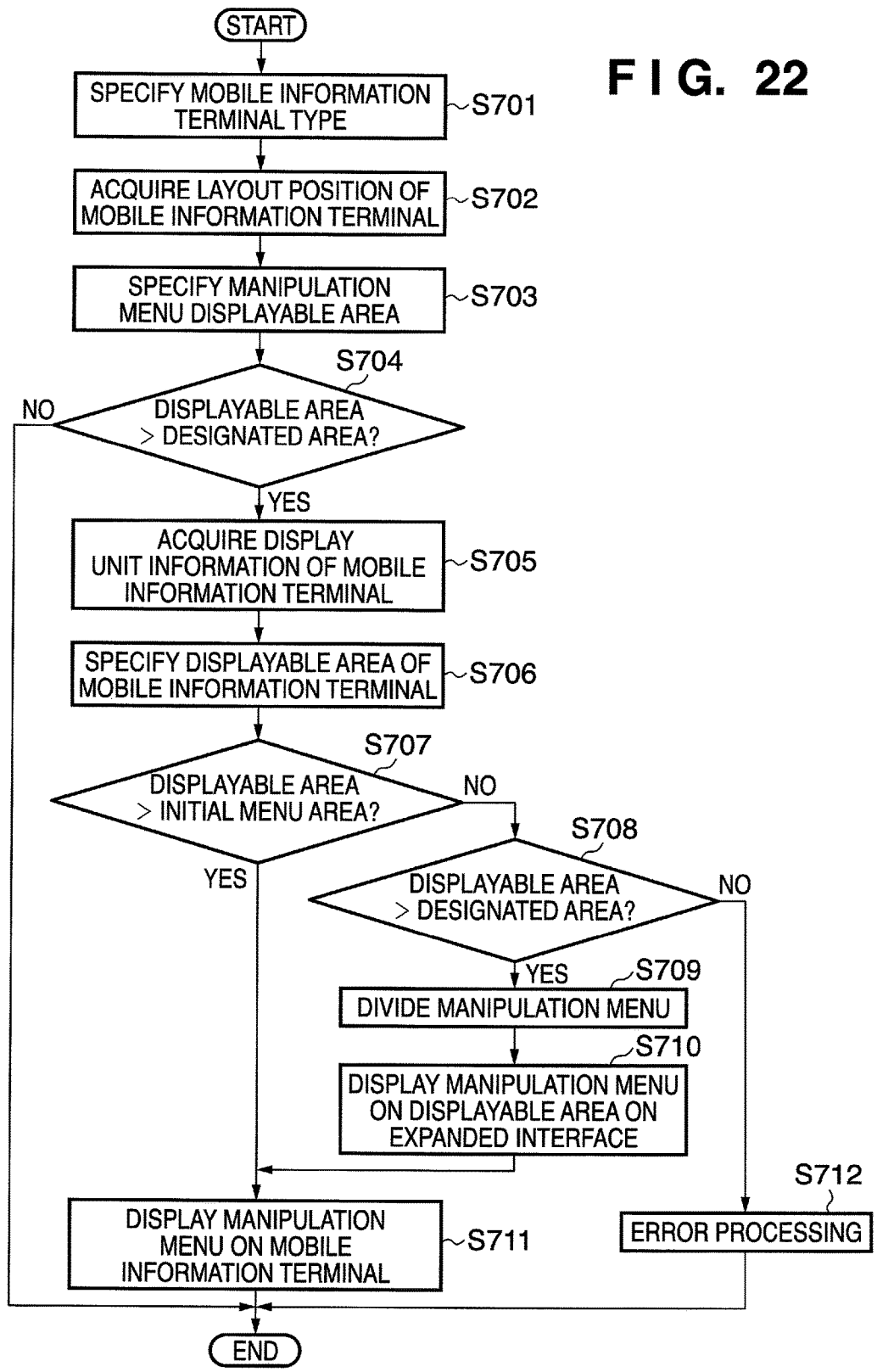
FIG. 22 is a flowchart showing the display processing in a communication mode according to the fifth embodiment.

FIG. 22 is a flowchart showing the display processing in the communication mode in the image processing apparatus 100 of the fifth embodiment.

The mobile information terminal detection unit 205 specifies the type (to be referred to as a terminal type hereinafter) of the mobile information terminal 800 placed on the expanded interface 104 (S701). This specification is made based on a communication response from the mobile information terminal 800. The mobile information terminal detection unit 205 further specifies position information (to be referred to as layout position information hereinafter) where the mobile information terminal 800 is placed on the expanded interface 104 (S702).

The manipulation menu area specification unit 214 specifies an area of a manipulation menu that can be displayed on the expanded interface 104 based on the layout position information acquired in step S702 and the display unit area information of the expanded interface 104, which is pre-stored in the image processing apparatus 100 (S703).

The controller unit 201 then checks if the size of the specified manipulation menu displayable area is smaller than a predetermined threshold (S704). If the size is smaller than the threshold, the display unit information acquisition unit 213 acquires the display unit information of the mobile information terminal 800 (S705), and specifies an area (size) of a displayable area of the mobile information terminal 800 (S706). On the other hand, if the controller unit 201 determines that the size is larger than the threshold, it displays a manipulation menu on the expanded interface.

The controller unit 201 checks if the size of the displayable area of the mobile information terminal 800 specified in step S706 is larger than an initial size of the manipulation menu 500 (S707). Only when the size of the displayable area is larger than the initial size, the controller unit 201 transfers the manipulation menu to the mobile information terminal 800 via the wireless communication unit 206, and displays the manipulation menu on the display unit 801 (S711).

If the controller unit 201 determines in step S707 that the size of the displayable area is smaller than the initial size, it further checks if the displayable area is larger than an area which indicates a minimum menu displayable area and is designated in advance (S708). If the controller unit 201 determines that the displayable area is larger than that area, it divides the manipulation menu into a menu part to be displayed on the expanded interface 104 and that to be displayed on the display unit 801 of the mobile information terminal 800 (S709). Furthermore, the controller unit 201 makes a menu display on the menu displayable area on the expanded interface 104 specified in step S703 (S710), and that on the display unit 801 (S711). On the other hand, if the controller unit 201 determines that the displayable area is smaller than that area, it displays, as error processing, an error message indicating that the manipulation menu cannot be displayed, on the display unit 801 or a display unit (not shown) of the image processing apparatus 100 (S712).

As the division method of the manipulation menu, the menu to be displayed may be divided into a processing menu and general manipulation menu. Furthermore, the size of the manipulation menu may be changed according to the areas of the menu displayable areas of the expanded interface 104 and display unit 801.

Also, the processing menu for the mobile information terminal may be displayed on the display unit 801, and the general manipulation menu may be displayed on the expanded interface 104.

Figure 23:
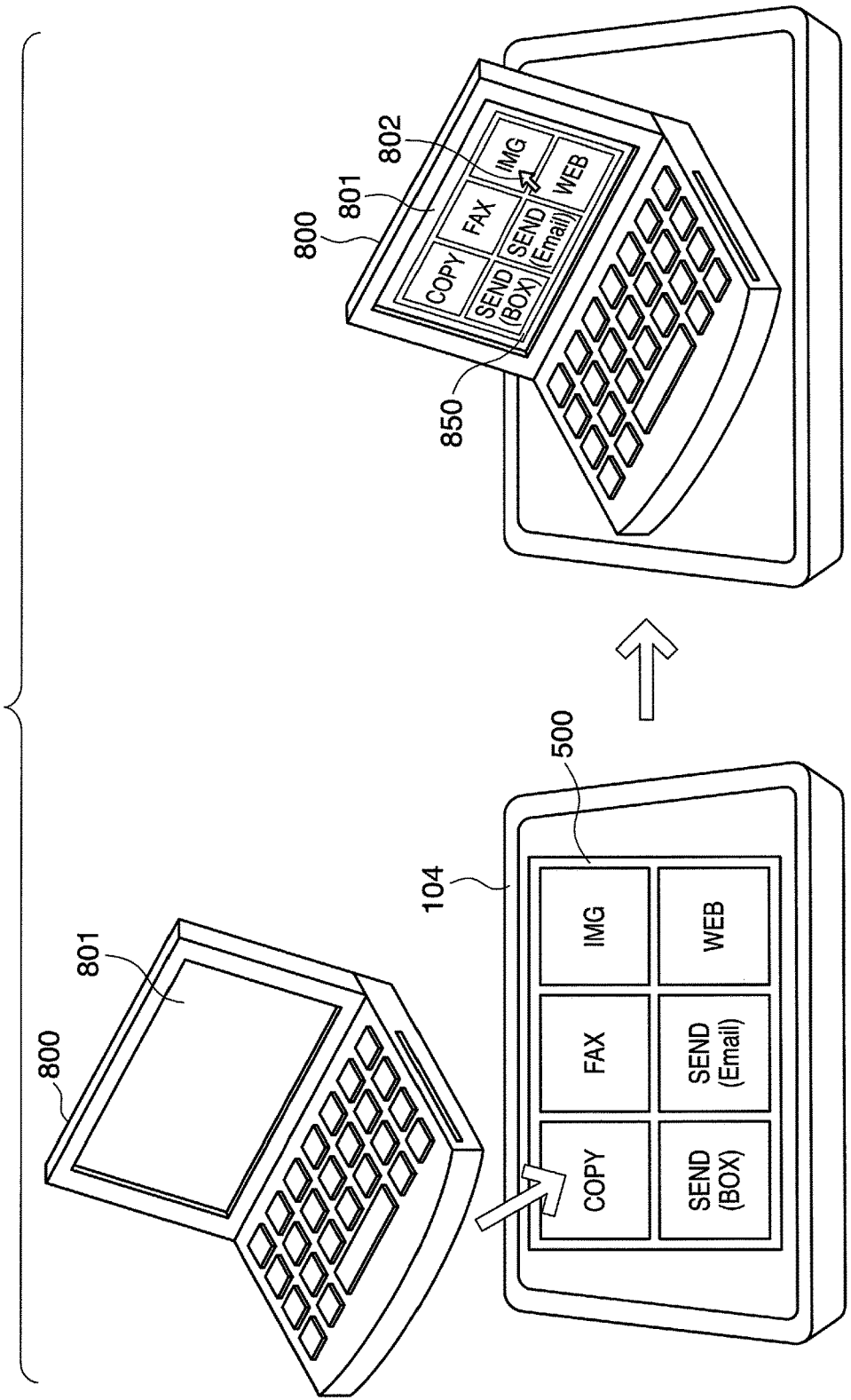
FIG. 23 shows a manipulation menu display transition example upon placing a mobile information terminal according to the fifth embodiment.

FIG. 23 shows the concept of transition of a menu display on the expanded interface 104 and that on the display unit 801 of the mobile information terminal 800 in this embodiment. In FIG. 23, assume that the display unit 801 has a displayable area larger than a display area of the default manipulation menu 500.

Referring to FIG. 23, when the mobile information terminal 800 is placed on the expanded interface 104 that displays the default manipulation menu 500 in advance so as to fully cover the expanded interface display unit, a manipulation menu 850 is displayed on the display unit 801. At this time, no manipulation menu is displayed on the expanded interface 104. In this case, a menu manipulation is attained using a user interface of the mobile information terminal 800. More specifically, the user selects the manipulation menu 850 by manipulating a pointer cursor 802 displayed on the display unit 801 using the mobile information terminal 800. The selection result of the manipulation menu is transferred to the controller unit 201 via the wireless communication unit 206, thus executing processing according to the selection result.

Figure 24:
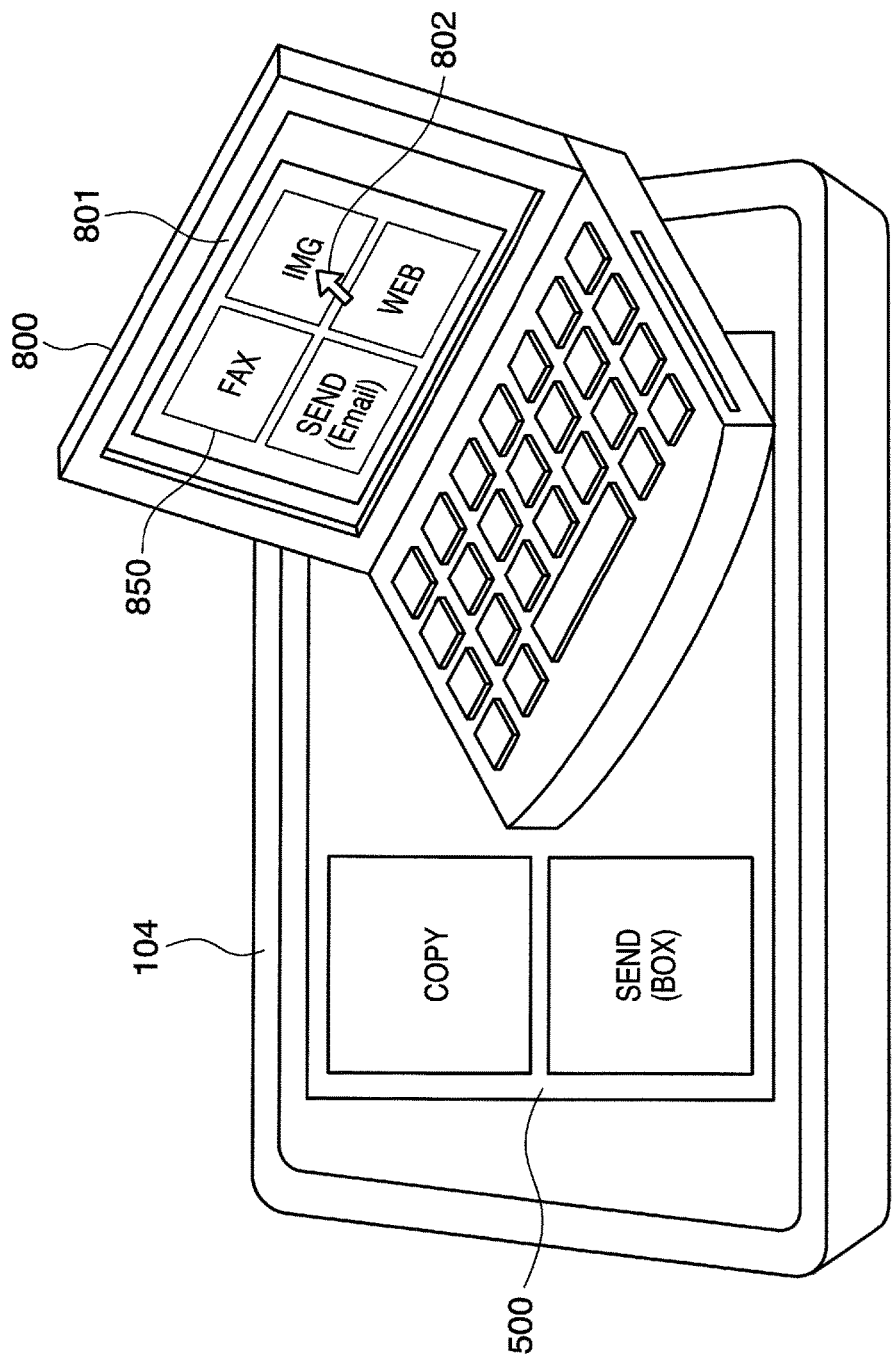
FIG. 24 shows another manipulation menu display transition example upon placing a mobile information terminal according to the fifth embodiment.

FIG. 24 shows another mode of a menu display on the expanded interface 104 and that on the display unit 801 of the mobile information terminal 800 in this embodiment. In FIG. 24, assume that the displayable area of the display unit 801 is smaller than a display area of the default manipulation menu 500, but is larger than a minimum menu displayable area which is designated in advance.

When the mobile information terminal 800 is placed on the expanded interface 104 to partially leave the expanded interface display unit, a processing menu for the mobile information terminal of the default manipulation menu 500 is displayed on the display unit 801 as the manipulation menu 850. On the other hand, a general manipulation menu of the default manipulation menu 500 is displayed on the displayable area on the expanded interface. Note that the user manipulates the processing menu using the user interface of the mobile information terminal 800, and the general manipulation menu via a touch panel UI manipulation on the expanded interface.

As described above, according to the fifth embodiment, even when a mobile information terminal 800 with a relatively large size is placed on the expanded interface 104, the manipulation menu can be displayed without being occluded by the mobile information terminal. In this manner, the user's operability can be prevented from impairing without displaying any manipulation menu.

Other Embodiments

The embodiments have been described in detail, but the present invention can adopt embodiments in the forms of a system, apparatus, method, program, storage medium (recording medium), and the like. More specifically, the present invention can be applied to either a system constituted by a plurality of devices (e.g., a host computer, interface device, image sensing device, Web application, and the like), or an apparatus consisting of a single device.

In the description of the above embodiments, the wireless communication unit 206 of the image processing apparatus makes both a communication required to detect the mobile information terminal 200 and that required to transmit print data and the like after detection. However, the image processing apparatus may comprise a plurality of types of wireless communication units, and may selectively use these wireless communication units to attain a communication required to detect the mobile information terminal and that required to transmit print data and the like. For example, the image processing apparatus may use a proximity wireless communication such as Felica or the like, in the communication required to detect the mobile information terminal, and may use a wireless communication such as Bluetooth, wireless LAN, or the like in the communication required to transmit print data and the like later.

Note that the present invention can also be achieved by directly or remotely supplying a program of software that implements the functions of the aforementioned embodiments to a system or apparatus, and reading out and executing the supplied program code by a computer of that system or apparatus. Note that the program in this case is that corresponding to each illustrated flowchart in the embodiments.

Therefore, the program code itself installed in a computer to implement the functional processing of the present invention using the computer implements the present invention. Put differently, the present invention includes the computer program itself for implementing the functional processing of the present invention.

In this case, the form of program is not particularly limited, and an object code, a program to be executed by an interpreter, script data to be supplied to an OS, and the like may be used as long as they have the functions of the program.

As a recording medium for supplying the program, the following media can be used. For example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like can be used.

As a program supply method, the following method may be used. The user establishes a connection to a home page on the Internet using a browser on a client computer, and downloads the computer program itself of the present invention (or a compressed file including an automatic installation function) from the home page onto a recording medium such as a hard disk or the like. Also, the program code that forms the program of the present invention may be segmented into a plurality of files, which may be downloaded from different home pages. In other words, the present invention includes a WWW server which makes a plurality of users download a program file required to implement the functional processing of the present invention by the computer.

Also, a storage medium such as a CD-ROM or the like, which stores the encrypted program of the present invention, may be delivered to the user, and the user who meets a predetermined condition may be allowed to download key information used to decrypt the encrypted program from a home page via the Internet. That is, the user can execute the encrypted program using the downloaded key information to install the program on a computer.

The functions of the aforementioned embodiments can be implemented when the computer executes the readout program. Furthermore, the functions of the aforementioned embodiments can be implemented when an OS or the like running on the computer executes some or all of actual processing operations on the basis of an instruction of that program.

Furthermore, the functions of the aforementioned embodiments can be implemented when the program read out from the recording medium is written in a memory equipped on a function expansion board or a function expansion unit, which is inserted in or connected to the computer, and is then executed. Therefore, a CPU equipped on the function expansion board or function expansion unit can execute some or all of actual processing operations based on the instruction of the program.

With the above arrangement, according to the present invention, in an image processing apparatus which generates an input apparatus when a mobile information terminal contacts a display surface and makes a wireless communication with the contacting mobile information terminal, whether or not the contacting object is a mobile information terminal is discriminated, and an appropriate display can be made according to the discrimination result.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-281738 filed on Oct. 16, 2006 and Japanese Patent Application No. 2007-044531 filed on Feb. 23, 2007, which are hereby incorporated by reference herein in their entirety.

What is claimed is:

1. An image displaying apparatus, comprising:
   a display;
   a memory storing instructions;
   one or more processors which execute the instructions and cause the image displaying apparatus to function as:
   a detecting unit configured to detect a mobile terminal placed on a display panel of the display;
   a determining unit configured to determine a display position of a display item in accordance with a position of the detected mobile terminal; and
   a control unit configured to control to display the display item at the determined display position;
   wherein the determining unit determines the display position to be a position of a predetermined distance from the position of the detected mobile terminal, and the display item is an item in accordance with a type of the detected mobile terminal and the display item includes at least a print item, and
   in a case where the detecting unit detects a plurality of mobile terminals placed on the display panel, the control unit controls the display to display a corresponding plurality of display items for selecting processing modes of the respective mobile terminals.

2. The apparatus according to claim 1, wherein the detecting unit includes an imaging unit to capture an image of an object on the display panel, and
   in a case where it is judged that the image of the object captured by the imaging unit is a finger of a human, the control unit controls the display to display first information based on a display item displayed at a position of the finger.

3. The apparatus according to claim 1, wherein the detecting unit includes an imaging unit to capture an image of an object on the display panel, and
   in a case where it is judged that the image of the object captured by the imaging unit is the mobile terminal, the control unit controls the display to display the display item for selecting the processing mode of the mobile terminal.

4. The apparatus according to claim 3, wherein the mobile terminal is a mobile phone, a digital still camera, a notebook type personal computer, or a PDA.

5. The apparatus according to claim 3, wherein the control unit controls the display to display the display item for selecting the processing mode of the mobile terminal at a position in close visual proximity to the detected mobile terminal so that correspondence with the detected mobile terminal can be recognized.

6. The apparatus according to claim 3, further comprising a communication unit configured to communicate with the detected mobile terminal.

7. The apparatus according to claim 6, wherein the communication unit is a wireless communication unit.

8. The apparatus according to claim 7, wherein the wireless communication unit communicates with the mobile terminal by a WiMAX (Worldwide Interoperability for Microwave Access), UWB (Ultra Wide Band), or Wifi protocol.

9. The apparatus according to claim 3, wherein, in a case where the display has displayed plural display items before the object is placed on the display panel of the display and it is judged that the image of the object captured by the imaging unit is the mobile terminal, the control unit controls the display to display the display item for selecting a processing mode of the mobile terminal together with the plural display items.

10. The apparatus according to claim 3, wherein the imaging unit is a camera.

11. The apparatus according to claim 2, wherein, if the display item displayed at a position of the finger is copy icon, the control unit controls the display to display a copy screen on the display panel of the display, for performing a copy processing.

12. The apparatus according to claim 2, wherein the display is touch panel.

13. A method of controlling an image displaying apparatus, the method comprising the step of:
   detecting a mobile terminal placed on a display panel of a display;
   determining a display position of a display item in accordance with a position of the detected mobile terminal; and
   controlling to display the display item at the determined display position;
   wherein the display position is determined to be a position of a predetermined distance from the position of the detected mobile terminal, and the display item is an item in accordance with a type of the detected mobile terminal and the display item includes at least a print item, and
   in a case where a plurality of mobile terminals placed on the display panel are detected, further controlling the display to display a corresponding plurality of display items for selecting processing modes of the respective mobile terminals.

\* \* \* \* \*